United States Patent [19]
Donahue
[11] 3,820,081
[45] June 25, 1974

[54] OVERRIDE HARDWARE FOR MAIN STORE SEQUENCER

[75] Inventor: Thomas J. Donahue, Hudson, Mass.
[73] Assignee: Honeywell Information Systems Inc., Waltham, Mass.

[22] Filed: Oct. 5, 1972
[21] Appl. No.: 295,418

[52] U.S. Cl. .......... 340/172.5
[51] Int. Cl. .......... G06f 7/00, H03k 19/00
[58] Field of Search .......... 340/172.5; 307/261, 268; 328/110

[56] References Cited

UNITED STATES PATENTS

| | | | |
|---|---|---|---|
| 3,226,689 | 12/1965 | Amdahl et al. | 340/172.5 |
| 3,386,036 | 5/1968 | Gerrard et al. | 328/110 |
| 3,543,242 | 11/1970 | Adams et al. | 340/172.5 |
| 3,593,302 | 7/1971 | Saito et al. | 340/172.5 |
| 3,665,412 | 5/1972 | Briand | 340/172.5 |
| 3,699,524 | 10/1972 | Norberg | 340/172.5 |

*Primary Examiner*—Paul J. Henon
*Assistant Examiner*—Michael Sachs
*Attorney, Agent, or Firm*—Nicholas Prasinos; Ronald T. Reiling

[57] ABSTRACT

An override assurance electrical network and override circuitry for overriding request signals issued to a computer for control of access to a main memory store. First and second dynamic storage electrical networks receive and store electric request signals. The request signals are delayed in said first and second electric networks by predetermined amounts, and an override signal is generated by means responsive to the delayed request signals.

12 Claims, 15 Drawing Figures

OVERRIDE HARDWARE FOR MAIN STORE SEQUENCER

RELATED APPLICATIONS

1. "Buffer Store" invented by J. L. Curley, T. J. Donahue, W. A. Martland, and B. S. Franklin, filed on same date as the instant application, having Ser. No. 295,301 and assigned to the same assignee named herein. 2. "Variable Masking for Segmented Memory" invented by Wallace A. Martland and John L. Curley, filed on same date as the instant application, having Ser. No. 295,303 and assigned to the same assignee named herein.

3. "Main Memory Reconfiguration" invented by T. J. Donahue, John L. Curley, Benjamin S. Franklin, W. A. Martland, and L. V. Cornaro, filed on same date as the instant invention, having Ser. No. 295,417 and assigned to the same assignee named herein.

4. "Memory Storage Sequencer" invented by John L. Curley, Thomas J. Donahue, Benjamin S. Franklin, Wallace A. Martland and Louis V. Cornaro, filed on the same date as the instant invention having Ser. No. 295,331 and assigned to the same assignee named herein.

BACKGROUND OF THE INVENTION

1. Field of the Invention

This invention relates to computer priority resolving systems between a central processing unit (CPU), buffer store (BS), input-output control unit (IOC) and a main memory store (MMS), and more particularly to an override assurance electrical network and override circuitry for overriding priority requests for control of access to the MMS.

2. Description of the Prior Art

In most computer systems generally, and in multiprocessor systems in particular, processors must compete with each other or with input/output devices for access to main memory or buffer store (if any), because a memory can generally service only one processor device at a given time. To resolve priority, several prior art schemes have been utilized. One technique tries to minimize simultaneous access to main memory by decreasing the probability of simultaneous access requirements. The memory is physically constructed in a number of separate, independent, relatively small modules of memory, and is provided with a centralized switch that can connect any memory module to any processor in accordance with the memory access needs of the processor. It can readily be seen that the more modules there are, the greater is the probability of a processor obtaining unimpeded access to a particular module it desires; thus a given processor's performance is not degraded by interference from other processors. This scheme is utilized in part in the instant invention, but there are serious drawbacks to its use exclusively. For example, for a given total size of memory, if the memory modules are doubled, the physical hardware in the memory system practically doubles, even though the number of memory storage units (i.e., cores, flip-flops) has not changed.

In order to utilize the benefits of the above system and minimize its disadvantages one prior art system utilizes a Memory Bus Controller (MBC) which acts as an arbitrator to resolve conflicts where more than one processor needs access to a particular memory module. The MBC contains four link flops for each memory module coupled to the MBC with priority logic associated with each set of each link flops. The function of the link flops is to indicate whether a particular module is busy or available. If the module is available, the priority logic associated with the link flops of that module, evaluates at each clock interval any processor requests for the module, and issues an acknowledgement to a selected processor and a start common to the memory module, thus connecting the two together for one memory accessing cycle. If two or more processors simultaneously request a given memory module, then the MBC resolves the conflict on a predetermined priority basis (i.e., an IOC unit has priority over a CP unit) and one unit is selected to access the memory module whereas the other unit stalls or is placed in a "wait" condition for one full clock cycle. In this prior art scheme priority is settled during one clock cycle. Once priority is settled another clock cycle is required for the "winner" to issue its Go signal. It is readily seen that a delay of at least one additional clock cycle is required to direct main memory that information is available and ready for its use. Moreover the hardware for this system is quite complex requiring a central timing clock, relatively complex priority logic, temporary memory flops to store request and acknowledge signals, and a relatively complex system (i.e., memory bus controller.)

Another more recent device is described in a U.S. Pat. No. 3,676,860 issued to W. W. Collier et al entitled Interactive Tie-Breaking System. It is a "multiple processor tie-breaking method separately and asynchronously used by each of any number of plural processors contending for a serially reusable resource (SRR). The contending processors independently and asynchronously interact in their use of the tie-breaking method to choose among themselves which processor will get the SRR.

The method uses a common group of registers (or fields) accessible to all contending processors. The method permits uncoordinated fetching and storing of bits in those registers. Only one bit at a time need be fetched or changed by any processor. In fact, the plural independent processors can concurrently fetch or store the same bit in the common group of registers without affecting the reliability of the method.

The priorities among processors dynamically change with every contention in a manner which gives each processor an equitable and equal chance of getting the SRR." (Patent Office, Official Gazette, July 11, 1972; p. 789.) Once again, it appears obvious that relatively complex and highly sophisticated circuitry is required.

Still another prior art device for determining priority is described in U.S. Pat. No. 3,473,155 and issued to J. F. Coulleir et al., on Oct. 14, 1969 entitled Apparatus Providing Access to Store Device on Priority. In that device identification of the highest priority channel currently requiring access to a communicating link is made, whereby access to a communication link is provided for one link-cycle to the highest priority channel then in competition with other lower priority channels for access to the same communication link. (See also U.S. Pat. Nos. 3,490,003; 3,440,616.

Once priority has been resolved between competing units but before notification to the competing units of such resolution and assignment of control to main memory store access, it may become necessary to override such assignment and issue control of main memory access to another unit.

OBJECTS

It is an object, therefore of the invention to provide an improved override electrical network for overriding the assignment of control of the MMS.

It is another object of the invention to provide an override electrical network which is reliable in operation and relatively simple to manufacture and assures the overriding of request signals issued to the MSS for control of the MSS.

Still another object of the invention to provide an asynchronous override electrical network for overriding the assignment of control of the MMS.

Other objects of the invention will become apparent from the following description of the preferred embodiment of the invention when read in conjunction with the drawings contained herewith.

SUMMARY OF THE INVENTION

The foregoing objects are achieved, according to the instant invention by an override assurance electrical network and override circuits for overriding request signals issued to a computer for control of access to a main memory store (MMS).

First and second dynamic storage electrical networks receive and store electric request signals. The request signals are delayed in said first and second electronic networks by predetermined amounts, and an override signal is generated by means responsive to the delayed request signals.

DESCRIPTION OF A PREFERRED EMBODIMENT

Figure 1:
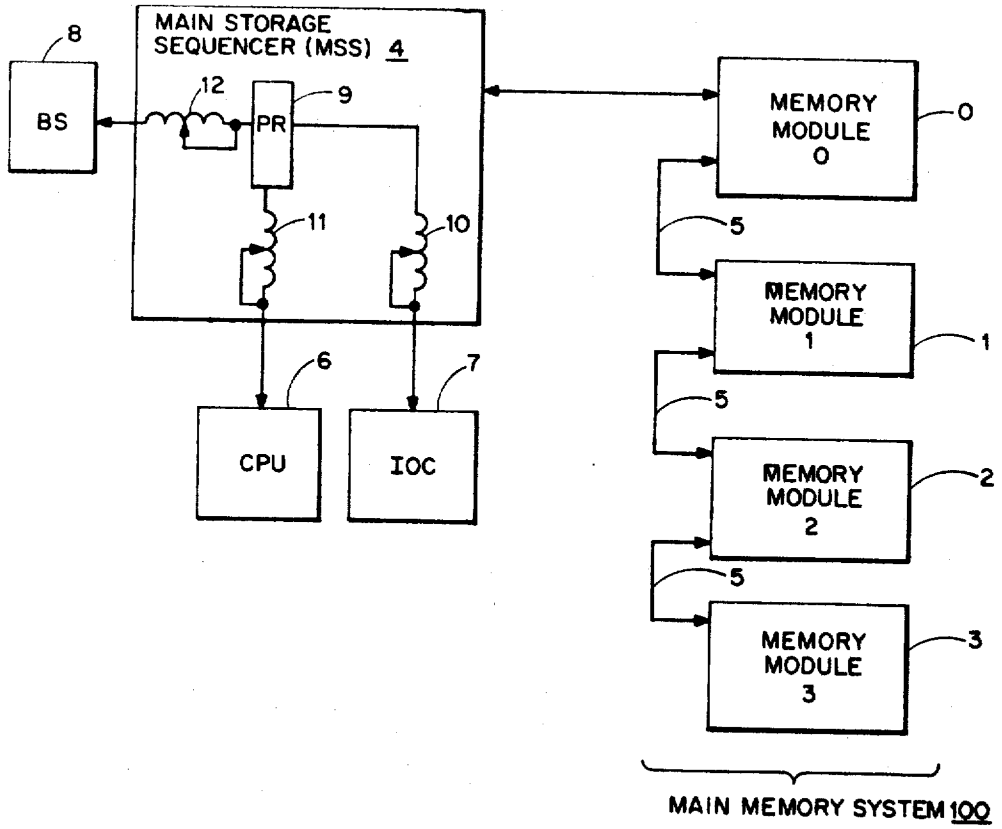
FIG. 1 is an overall block diagram showing the invention architecture.
Figure 12:
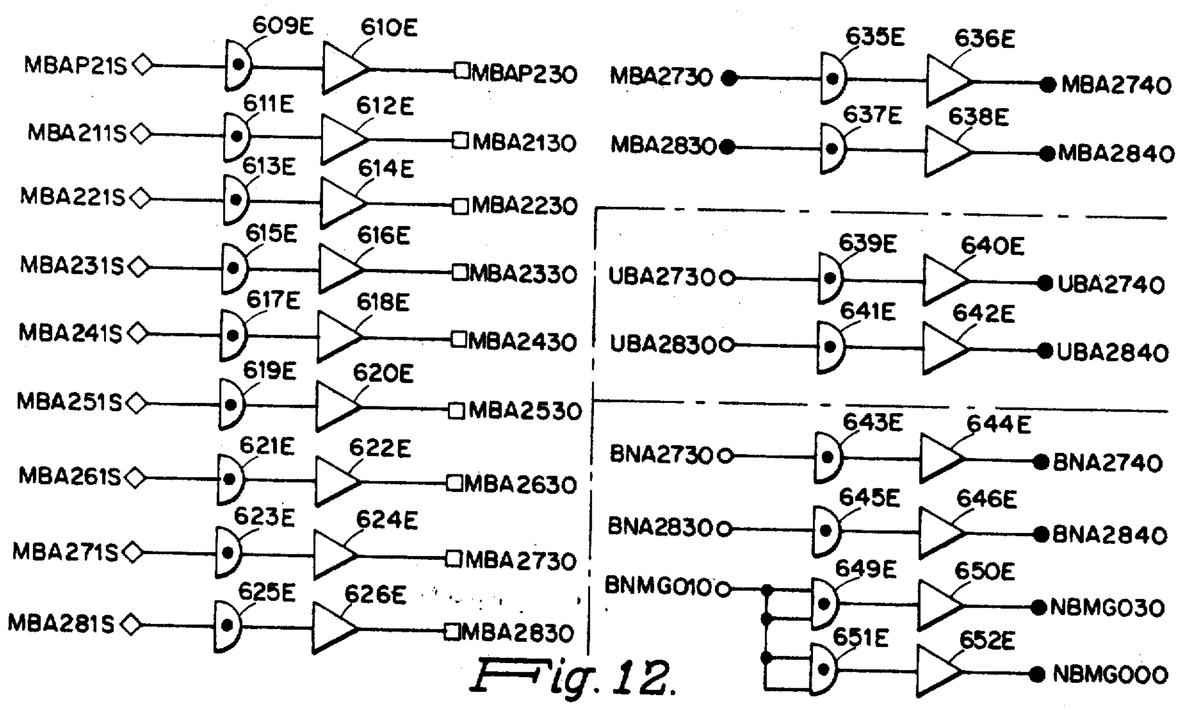
FIG. 12 is a logic block diagram of IOC address amplifiers.

GENERAL:

Referring to FIG. 1 there is shown a block diagram of the architecture of the invention. In general a Main Store Sequencer 4 has a Priority Resolver 9 for resolving conflicts between the Central Processing Unit 6, the Input Output Controller 7, and the Buffer Store 8, when these units simultaneously request access to main memory 100. The request for memory is under the control of a central clock (not shown) of the CPU 6. The actual resolution of priority is under the asynchronous control of the Main Store Sequencer 4. Since a synchronous device (not shown) is utilized to start a main memory request from any of the competing devices, a common base point is provided for measuring time thereafter. Hence, since it is desirable to provide memory access to the IOC which sometimes may be under conditions of simultaneous requests for main memory by the CPU and BS, and because the CPU and BS are physically closer to the main memory store, there is a greater distance for the request signal from the IOC 7 to travel and therefore the IOC request signal could reach its destination at a later time than the CPU request signal. To assure that this does not happen, variable delay lines 10, 11 and 12 are provided in the main store sequencer 4, and are interposd between the IOC, CPU and BS and the Main Memory Store respectively. The Main Memory Store 100 is typically an MOS or core memory comprising typically 4 memory modules 0–3, daisy chained to each other by a memory bus 5.

Figure 2:
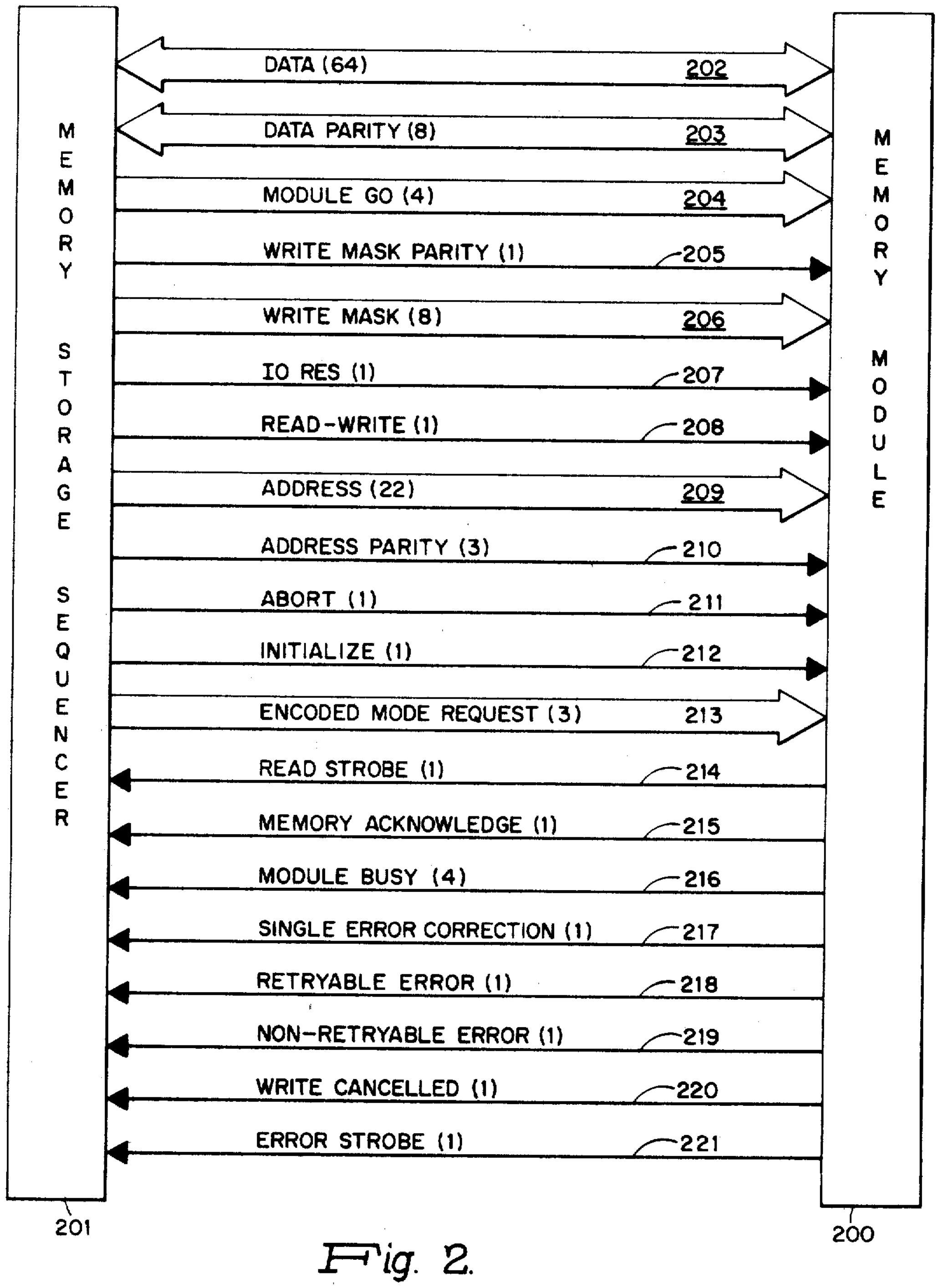
FIG. 2 is a block diagram showing interface lines between the invention and a typical memory module.

Referring to FIG. 2 there is shown the interface lines between a typical Memory Module 200 and the Main Store Sequencer 201. In FIG. 2 the number in parenthesis refers to the number of physical lines, in this embodiment, provided for carrying a signal/or signals for indicating a particular function or functions. It is to be understood that other total numbers of lines may be used to practice this invention.

There are typically 64 parallel bidirectional Data lines 202 which may carry positive pulses to be stored and/or utilized by the processing unit as a result of a read request. These Data lines also may carry voltage levels to be stored in an addressed memory module 200 as a result of a write request. Transfers of signals on these lines for a double-word is in parallel rather than serial or sequential mode. Associated with these data lines there are 8 parallel bidirectional Data Parity lines 203 for carrying signals for determining the parity of the data transmission. Odd parity is utilized.

There are 4 module strobe lines herein termed Go lines 204 which may carry Go signal levels which along with other signals indicate which memory module is to be accessed. In general the Go signal is utilized to indicate that all information needed by the MMS has been placed on the interface for the disposal of the MMS.

There are typically 8 Write Mask lines 206 which may carry signals to specify which byte or bytes (if any) within an eight byte double-word is/are to be written into main memory. Associated with the Write Mask lines there is also 1 Write Mask Parity line 205 utilized to carry a signal for checking the parity on the 8 Write Mask lines.

One IO reservation line 207 may carry an I/O cycle reservation signal for use in blocking a refresh cycle in the MOS memory refresh logic. (See application Ser. No. 215,736, filed 12/27/71 on Technique for Refreshing MOS Memory and assigned to the same assignee as the instant invention for typical MOS memory refresh logic.)

There are 22 Address Lines 209 for addressing any double-word location within a given memory module.

Associated with these address lines there is a read/write line 208 for carrying signals indicating to the memory module the type of operation it is to perform i.e., read or write. Also associated with the Address lines there are three Address Parity lines 210 for carrying the signals utilized in checking parity of a given address in a main memory module.

One Abort line 211 carries a signal indicating that the processor wishes to change its memory write request to a memory read operation. There is also 1 Initialize line 22 that carries a signal which forces all memory modules to reset all their error indicators, counters, and controls.

Three other lines, the Encoded Mode Request line 213 carry encoded signals requesting memory module operation in a special mode e.g., diagnostic mode. One Read strobe line signifies that read data on the data lines 202 is valid when a parity signal is carried thereon. A memory acknowledge line 215 is provided for signaling to the MIU to indicate that the selected memory module has received the request sent and is accepting it and therefore the MIU can release its Go, Address, Masks, and/or Read/Write lines that it may be holding.

Four Module Busy lines 216 are also provided, one for each memory module for carrying signals that indicate to the main store sequencer that the memory addressed is busy (i.e., in the middle of a cycle) when a negative signal is carried by a module busy line associated with the memory module addressed.

One Single Error Correction line 217 may carry positive pulses that indicate that a single bit data error has been corrected in a memory module. Another line, the Retryable Error line 218, indicates a memory error which is retryable by the CP or IOC has occurred e.g., error in any parameter except MMS clock whereas still another line, the Non-Retryable Error line 218 indicates that a memory error which is not retryable by the CP or IOC has occurred e.g., MMS clock. A Write Cancelled line 220 indicates that the memory module addressed changed a write request to a read operation when a positive pulse appeared on the Write Cancelled line 220. Finally the last line on FIG. 2 is an Error Strobe line 221 which is utilized when a positive pulse is thereon to latch error signals in the CP, IOC, or BS.

Figure 3:
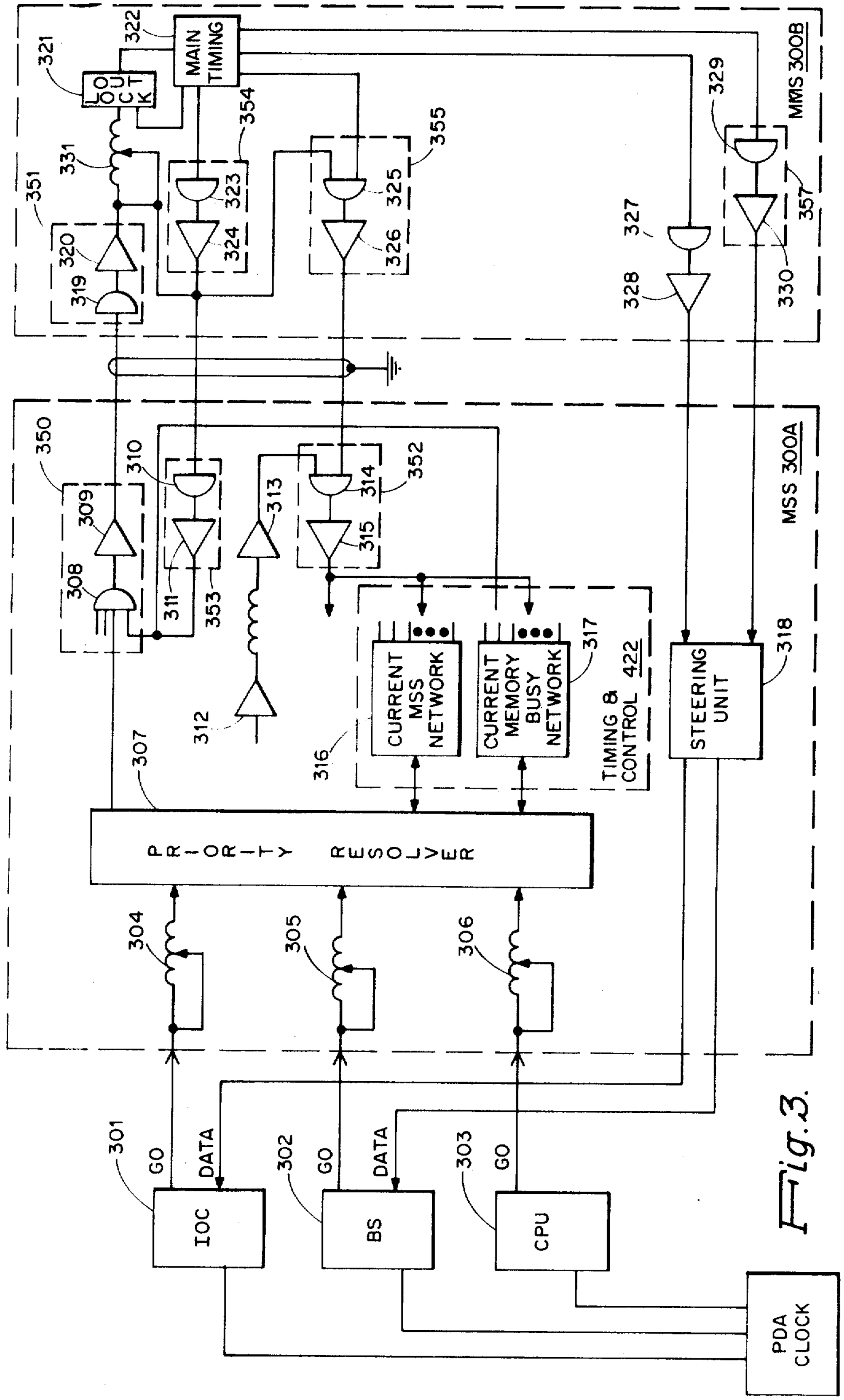
FIG. 3 is a high level logic block schematic diagram of the invention.

Referring to FIG. 3 there is shown a high level logic block diagram of the invention. The MSS 300-A is part of the Memory Interface Unit MIU shown on FIG. 3 of the above referenced related U.S. Pat. application Ser. No. 295,301. The Main Store Sequencer (MSS) 300-A is coupled to and communicates to Main Memory Store (MMS) 300-B via the lines discussed supra in relation to FIG. 2. (For the purpose of simplifying the explanation of the structure and operation of the invention, FIG. 3 has been stripped of details that are to be shown, and described later in conjunction with other Figures below.) The MSS 300-A comprises basically a Priority Resolver 307 which is coupled to Input/Output Control unit (IOC) 301, Buffer Store (BS) 302, and Central Processor Unit (CPU) 303 via Go lines and variable delay lines 304, 305 and 306 respectively. The Priority Resolver 307 basically senses the Go signal, sent by the IOC, BS, or CPU, which arrives first and assigns the MSS on that basis. In the situation where there is a simultaneous request from the IOC, BS and CPU as determined by the central clock (not shown) in the CPU, the variable delay lines 304, 305 and 306 provide an appropriate delay to ascertain that the request from the IOC 301 reaches the Priority Resolver 307 before the request of the BS 302 or the CPU 303. Once the request for a given memory module from a particular unit reaches the Priority Resolver, the MSS 300-A is given to that particular unit, and the competing units are locked out. Once a particular requesting unit (e.g., the IOC) has gained control of the MSS the Go signal is forwarded to an appropriate Memory Module Select Device 350 typified here by AND gate 308, and amplifier 309. The memory module select device only one of which is shown on FIG. 3 will be enabled when the appropriate signals are applied to the input of AND gate 308. Some typical signals that must be high for enabling AND gate 308 are as follows: (1) a signal indicating the memory module that is desired, (i.e., module address) (2) a signal indicating that the memory module desired is not busy, (3) a signal indicating which unit has been assigned control of the MSS, (4) and of course the Go signal. When the memory module select device 350, typified by AND gate 308 and amplifier 309, is enabled; the Go signal is then forwarded to the selected memory module to be received by a first Receiver Unit 351 typified by AND gate 319 and amplifier 320. When the first Receiver Unit 351 is enabled, the signal from it is applied to one input terminal of an Acknowledge Unit 355 typified by AND gate 325 and fast line driver 326. The other input signal to the Acknowledge Unit 355 issues from Memory Timing Unit 322, which provides an enabling signal to Acknowledge Unit 355 when the MSS 300-B is not in the process of refreshing itself. (See previously referenced application Ser. No. 215,736 for memory refresh apparatus and logic.) When both input signals to AND gate 325 of Acknowledge Unit 355 are high, the Acknowledge Unit is enabled and issues an acknowledge signal to the MSS 300-A indicating that it has received its appropriate Go signal and is working on its request associated with that Go signal. The acknowledge signal is received by a second Receiver Unit 352 which amplifies it and distributes it to a current MSS Busy Network 316, and a Current Memory Busy Network 317. Networks 316 and 317 are further coupled to Priority Resolver 307 for transmitting information thereto pertinent to the current state of memory future-use by the priority resolver in resolving conflicts and priorities. The acknowledge signal is also distributed back to the user i.e., IOC, BS, or CPU to indicate to the user that its request and all information associated therewith has been accepted and therefore the user may change requests and associated information.

The receipt of the acknowledge signal by the second Receiver Unit 352 is followed by a signal on Memory Busy Unit 353 typified by AND gate 310 and amplifier 311. The memory busy signal is generated by Memory Busy Generator 354 which receives its input information from Memory Timing Unit 322. The Memory Timing Unit, on the other hand, receives the Go signal issued by the user via delay line 331 and Lockout unit 321. The purpose of the Lockout unit is to prevent acceptance of another Go signal and to Lock-out another user from that particular memory module selected, while the first user is utilizing it. Once the Lockout Unit 321 is enabled, and the Go signal is received by Acknowledge Unit 355 as one input terminal of AND gate 325, the acknowledge signal can be issued when the other input terminal of AND gate 325 is driven high by a signal issued by Memory Timing Unit 322.

Data lines etc. (shown on FIG. 2) couple the IOC, BS, and CPU to the MMS 300-B via the MSS 300-A. Two such lines are shown for each unit on FIG. 3 although it is understood that they encompass all the lines of FIG. 2. Assuming that the IOC desires to perform a write cycle into an addressed location of a particular memory module; then the data is applied to the appropriate Data lines, moreover the write flag signal is applied to the Read/Write lines, the appropriate address signals where data is to be stored is applied to the Address lines; and the appropriate portions (i.e., bytes) of data to be written into the selected address is selected by applying the appropriate signals to the Write Mask lines, 206 and finally if more than one cycle is desired by the IOC a signal is applied to the IO Reservation line 207. When all these signals have been applied and have been checked for validity and the selected MMS module is not busy, then the Go signal of the IOC is allowed to be sent to the MMS indicating that all information is on the lines.

On a read cycle, similar lines are utilized; however a Strobe Unit 357 is located in MMS 300-B is enabled to indicate the information is available from the MMS. When AND gate 329 and amplifier 330 of Strobe Unit 357 is enabled the information on the group of Data lines, etc. is routed to Steering Unit 318 which directs the information to the appropriate requesting unit (the IOC in this case).

Figure 4A:
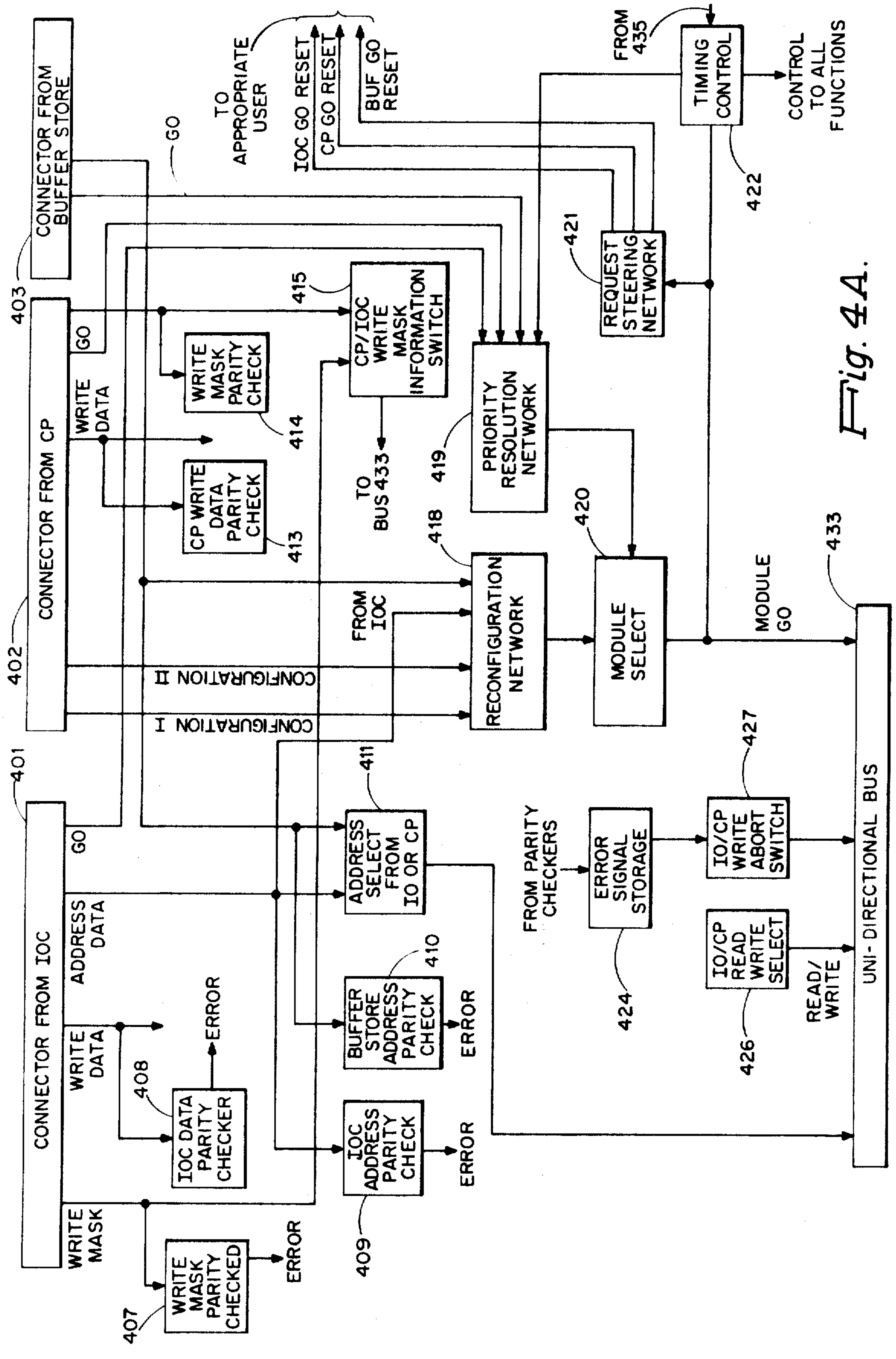
FIGS. 4A + 4B are high level block diagrams of the Main Store Sequencer.
Figure 4B:
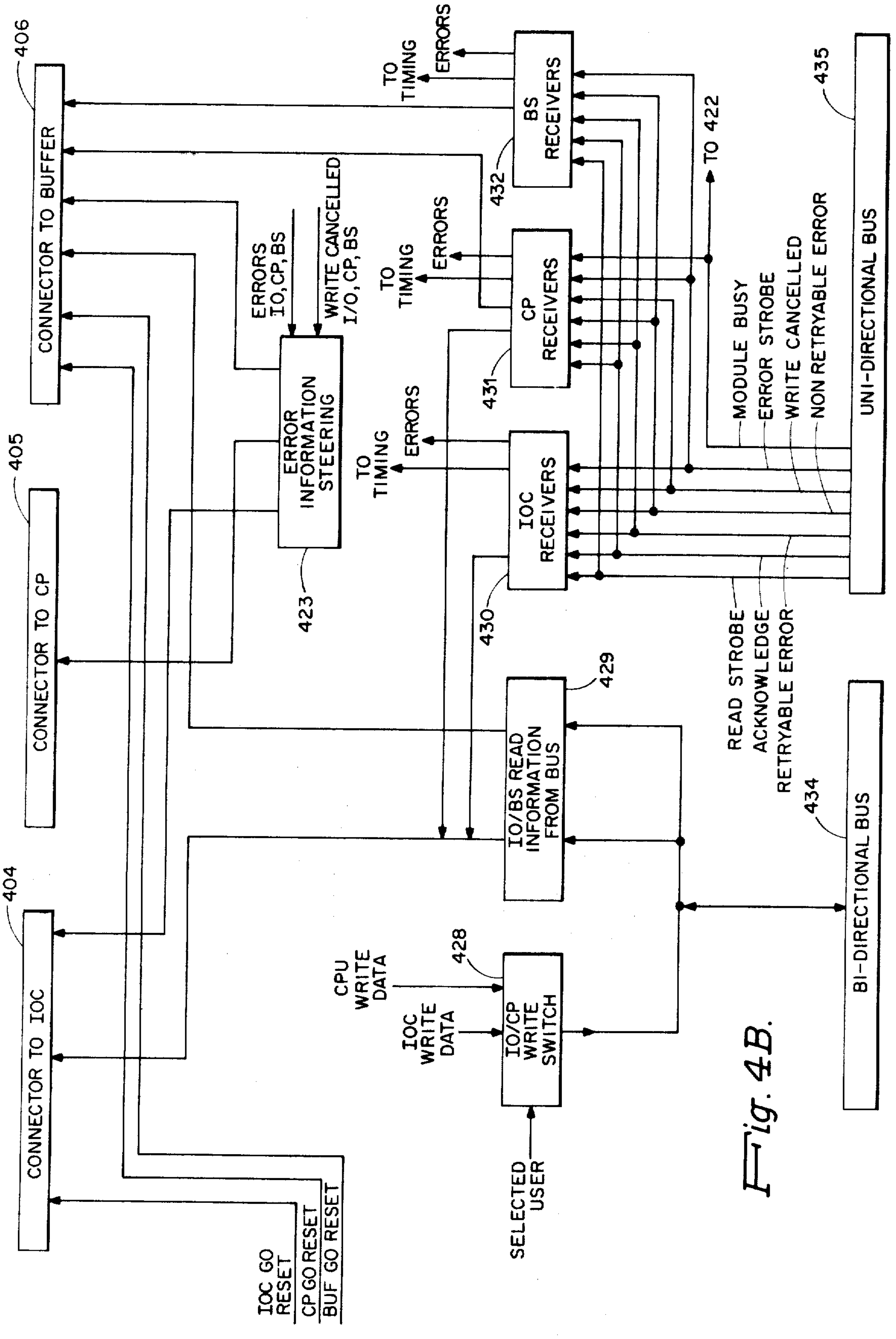

Referring now to FIGS. 4A and 4B there is shown an overall block diagram of the Main Store Sequencer. In order to view the Main Store Sequencer in proper perspective FIG. 4A should be viewed in conjunction with FIG. 4B, and with FIG. 4A being placed on the left of FIG. 4B. Three connectors 401, 402, and 403, receive signals from the IOC, the CPU and the buffer store (not shown in this Figure) respectively and distribute these signals to various elements of the MSS. Three connectors 404, 405 and 406 receive signals from the MSS unit and distribute these signals to the IOC, to the CPU and to the buffer store respectively. A connector 433 receives signals from various elements of the MSS and delivers them to main memory, not shown; while another connector 435 receives signals from main memory and delivers them to the MSS.

Assume that it is desired to perform a write operation into main memory from the IOC. Certain start parameters in the form of electronic signals are applied to the MSS via the IOC connector 401. The start parameters may include data signals, address signals, write mask signals and data parity signals. The address signals are applied to the main memory via an address select switch 411. Data from the IOC is transmitted via connector 401 to IO/CP Write Switch 428 and bidirectional bus 434. The data is checked for parity errors by parity checker 408 and is sent to the IO/CP Write Switch on its way to the bidirectional bus 434. Also the address information is checked for address parity errors by IOC Address Parity Checker 409, and is forwarded to the main memory via Address Select unit 411 and bus 433. If a data error is detected, a Write Abort signal is sent to the MMS. Write mask information is also applied to the connector 401 from the IOC and delivered to CP/IOC Write Mask Information Switch 415 and Write Mask Parity Checker 407. The Write Mask Information is then applied to the bus 433 via the switch 415 to indicate which of 8 bytes of data is to be written into memory. Simultaneously, the information assumed for the example above and a Go signal is delivered to the MSS from the IOC to the connector 401; whereupon the Go signal is applied to Priority Resolution Network 419 which in turn determines if the addressed memory module is busy or not and moreover arbitrates any simultaneous requests from other units and selects the particular memory module via Module Select Unit 420 and then informs the appropriate module selected that the information is ready for its use. When the main memory has received the information sent by the IOC an acknowledge signal is sent to the IOC via unidirectional bus 435, through IOC receivers 430 and connector 404. Moreover the main memory issues the appropriate module busy signal via unidirectional bus 435 to timing control 422. The timing control provides control functions such as determining when the write data is transmitted to the bus or when the error signals may be received from the main memory module via bus 435 and receivers 430, 431, or 432. Write data operations are similarly performed by the CPU utilizing its respective write data information, write mask information, address information, parity checkers and Go signals.

If it is desired that a particular unit such as the IOC perform a read operation the procedure is much like the write operation except that main memory will not write data and the Read-Write 208 signal will be false. The function of the Error Information Steering block, FIG. 423, is the MIU error registers. The output of all the parity checkers in the MIU feed the input to error registers, one for the IOC and one for the CP Buffer. The input to the register is strobed when the parity checker outputs are valid. If an error is detected, the error is stored in the register and the appropriate user is informed. The register can be read by the CPU on command.

The MSS of FIGS. 4A and 4B has a reconfiguration network 418 which is capable of changing the normal configuration mode of main memory from a normal mode (i.e., a 4-way interleaved configuration) to a reconfigured mode (i.e., 2-way interleaved mode). If there is a failure in any one memory module, the memory modules may be reconfigured so that at least half the memory capacity of the original system (i.e., addresses 0 to X/2 −1 where X equals original memory capacity) is assured to function correctly. The remaining half of the reconfigured system also remains addressable (i.e., addresses X/2 to X-1) but access to this portion of the storage can produce unspecified results. However this retention of full addressing to all of memory substantially aids in diagnostic procedures because a portion of the memory is utilized by the user whereas the memory containing a fault is utilized by the diagnostician.

Referring to pages 19-21 of the above referenced patent application on "Buffer Store" to J. L. Curley et al there is described in connection with FIG. 10 of that application the conventions for signal names, ascertions, and negations etc. that is also utilized in this application. FIGS. 5 through 7 will be described utilizing that convention. In addition the first letter of the signal or function names generally indicate the signal originates as follows:

N = Main Store Sequencer (MSS)

B = Buffer Store (BS)

U = A unit in the CPU
M = either IOC or MMS.

Figure 5A:
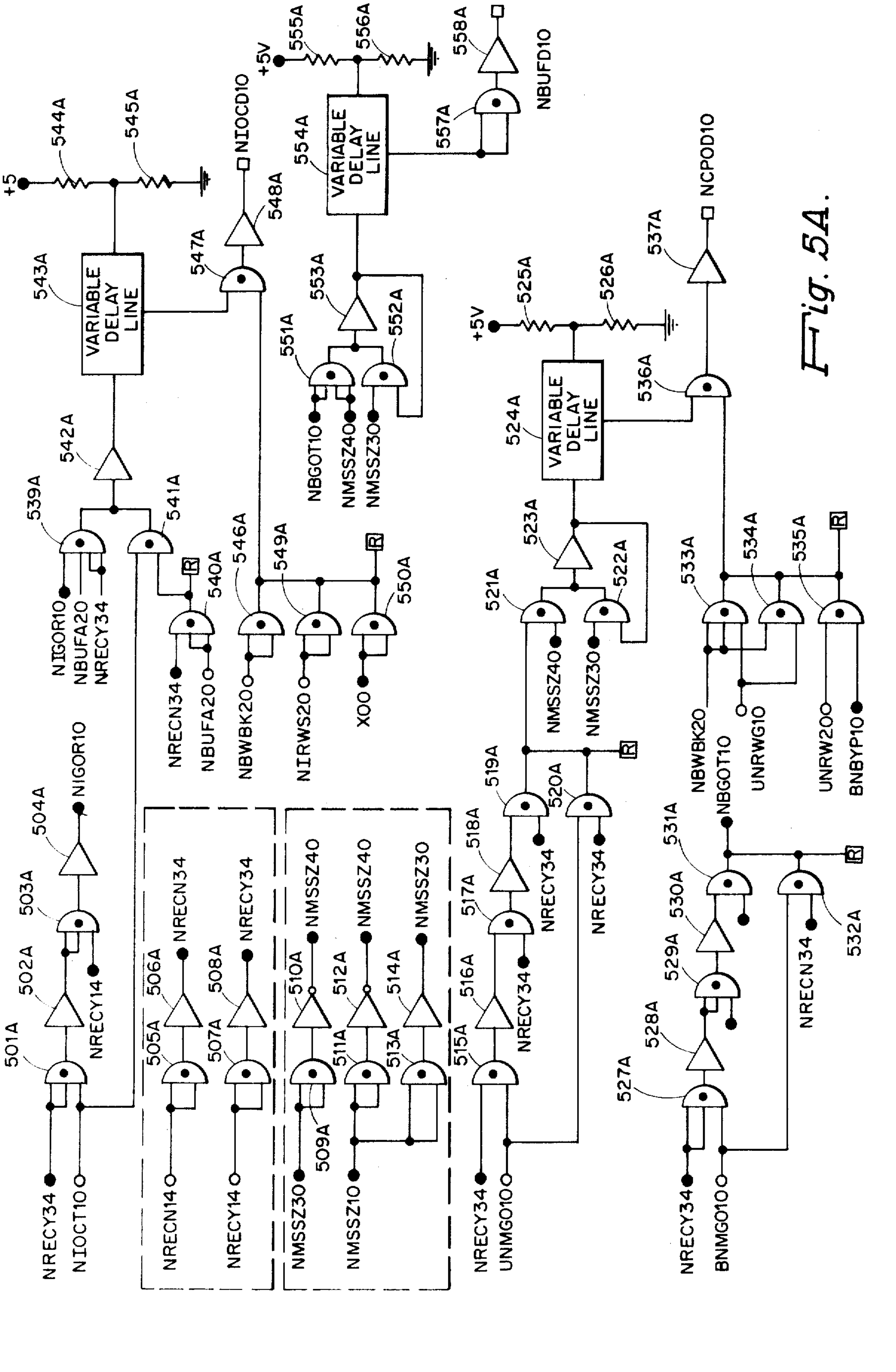
FIGS. 5A + 5B are detailed logic block diagrams of the priority resolving network.
Figure 5B:
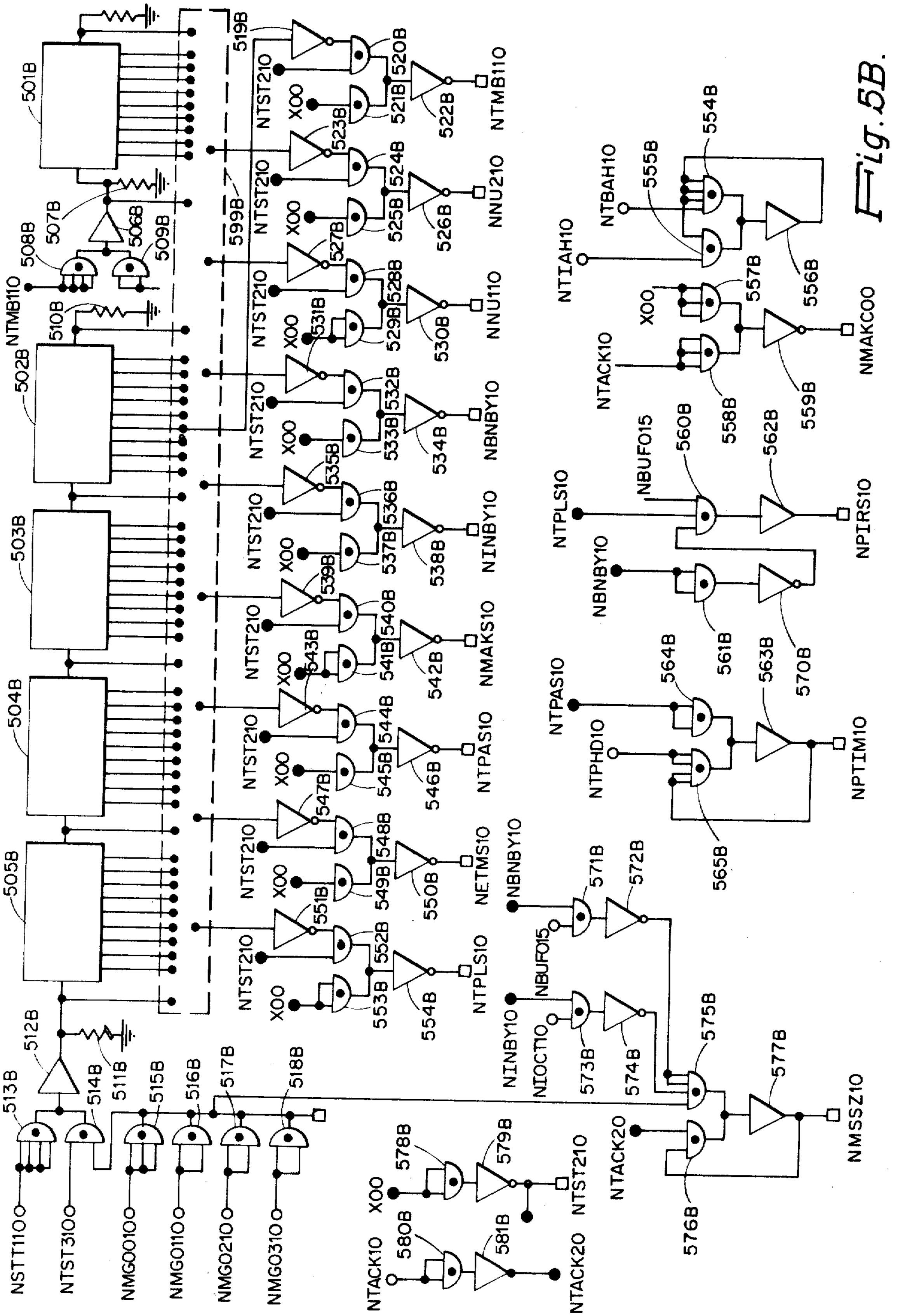

Referring to FIGS. 5A and 5B there is shown a detailed logic block diagram of the priority resolving network. With the conventions adopted and described in the prior referenced companion application and with the detailed logic block diagrams, taken together with the Glossary and definitions of the signal names, a person of ordinary skill in the art can practice the invention. For example, referring to FIG. 5A assume that the MSS has received a timing signal NIOCT10 (i.e., IOC Go signal) as one of its inputs which is applied to AND gates 501A and 541A. Assuming that the main memory is operating in normal mode; hence statement NRECY34 (See Glossary) is not true and the signal NRECY34 representing that statement is low, but signal NRECN34 applied to AND gate 540A is high since its representative statement is true. Moreover signal NBUFA20 is high since its representative statement Buffer is not the only user of the MSS allowed at this time is true. (It will be noted by referring to the Glossary and to the convention hereinbefore referenced that the statement NBUFA20 says buffer—BUF—is the only user—A (alone)—of the MSS—N—is not true—2—at the first level—0—). With both input signals applied to AND gate 540A high, it is enabled and its output is applied as one input of AND gate 541A. The other input of AND gate 541A is the signal NIOCT10 which is also high. With both inputs of AND gate 541A high then it too is enabled and the IOC Go signal continues through variable delay lines 543A and is applied to AND gate 547A. AND gate 546A is high if the previous cycle was a write by the CP and it is low if the previous cycle was a read. One legged AND gate 549A has applied a signal NIRWSZO which indicates that the signal of the IOC is to be allowed if the IOC is to perform a read operation and the signal of the IOC should be blocked if the IOC is to perform a write operation. Assuming for the purpose of this discussion that the IOC wants to do a read then the signal NIRWS20 is high and therefore AND gate 549A is enabled thus applying a second enabling signal to AND gate 547A. Therefore AND gate 547A is enabled and a high signal N10CD10 (IOC Go signal delayed) results at its output.

Examining other figures to determine where the signal NIOCD10 is applied it will be noted that it is applied to AND gate 606A and 608A of FIG. 7. Both of these AND gates are OR'ed to one input terminal each of AND gates 605A and 610A. Examining the input signals of AND gate 606A it will be noted that one of its input signals is NRECY13. This signal indicates Main Memory is in a reconfigured mode. Since however it has been previously assumed that memory is in a normal mode, the signal NRECY13 on gate 606A is low. Because the input signal NRECN13 on one input terminal of AND gate 608A is high our attention is focused to AND gate 608A. So far therefore there are two high input signals on AND gate 608A—NRECN13 and NIOCD10. However examining the remainder of the input signals on AND gate 608A—i.e. MBA2740 and MBA2840—it will be noted according to the convention that has been adopted that the next to the last bit is even which indicates the signals MBA2740 and MBA2840 are high when the statement they represent is not true; therefore signals MBA2740 and MBA2840 are low and AND gate 608A cannot be enabled. A search is instituted for other AND gates that have applied as inputs the signals NRECN13 and NIOCD10. It is found that AND gate 620A has such input signals. Moreover it will be noted that there are two additional input signals MBA2740 and MBA2830, which indicate signals from the IOC to the main memory and are the address bits (i.e., bits 27 and 28) which select the main memory module desired. It will be noted further that signal MBA2740 according to the convention that has been adopted and explained supra is not high since its representative statement is false as indicated by the next to the last bit which is even. Although the statement representative of signal MBA2830 is true and the signal is high, AND gate 620A is not enabled; therefore once again the search for another AND gate with 4 enabling input signals, two of which are NRECN13 and NIOCD10, is continued. It will be noted that AND gate 620B on FIG. 7 has all its input signals NRECN13, NIOCD10, MNBA2730, and MBA2830, have their next to the last bit odd and represent statements which are true and therefore these signals are high. With all high inputs on AND gate 620B high, it will be enabled and will apply a high signal to one input terminal of AND gates 616B and 622B respectively. The other input signal on AND gates 616B and 622B respectively is MNBZ300 which makes the statement "Main Memory Module number 3 is not busy"; this statement is true, therefore the signal represented by this true statement (i.e., MNBZ300 is high, thus providing a second enabling signal for AND gates 616B and 622B. With both these AND gates enabled the MSS Go signal NMG0310 is generated (i.e., is high) and is available for signaling that the utilization of memory module number 3 (i.e., the fourth memory module) can be utilized. Thus it has been illustrated how the detailed logic block diagrams taken together in conjunction with the signal names and the convention adopted herein teach a person of ordinary skill in the art to practice the invention without resorting to undue experimentation.

Referring to FIG. 5B there is shown circuitry that is utilized to block buffer and CP assignments when the IOC has gained control of the MSS, as was the case in the previous example. In particular the NMG0 signals from the various main memory modules are collected by AND gates 515B-518B figured 5B and are OR'ed together and applied as one input signal of AND gate 575B. This input signal is high when any one of the AND gates 515B–518B is high. Other input signals to AND gate 575B are applied through inverters 572B and 574B through AND gates 571B and 574B respectively. Hence for AND gate 575B to be disabled all input signals on AND gates 571B and 573B must be high or in the alternative both input signals on either AND gate 571B or AND gate 573B must be high. With at least one input signal low on each of AND gates 571B and 573B respectively and with at least one AND gate 515B–518B enabled then AND gate 575B is enabled and produces a signal NMSSZ10 which indicates that the MSS is busy servicing the IOC. The NMSSZ signal is latched high via AND gate 576B and remains high until the MSS completes servicing the IOC unit. It will be noted that the NMSSZ signal is utilized to either inhibit or allow a Go signal issued by the buffer to a particular memory module as is shown on AND gates 551A and 552A of FIG. 5A. Simiarly if the CPU or a unit in the CPU issues a Go signal indicated by signal UNMGO on AND gate 515A of FIG. 5A, a corresponding NMSSZ signal (i.e., MSS busy signal) is used to inhibit or allow the CP Go signal on AND gate 521A of FIG. 5A. It can be seen therefore that the buffer and the CPU are locked out when the IOC gains control of the MSS.

Referring to FIG. 5A the reconfigured mode of memory may be set up when necessary and may also be utilized by the IOC, the buffer or the CPU. For example if the reconfigured mode were being utilized then a signal NIGOR10 is generated at the output of amplifier 504A when the signals NRECY34 and NIOCT10 are high at the input terminals of AND gate 501A. NRECY is the signal indicating that the reconfigured mode is being utilized when this signal is high and of course the NIOCT signal is a request signal by the IOC for the memory service. With high signals NIGOR and NRECY applied to two of the input terminals of AND gate 539A it is enabled when the signal NBUFA20 signal is also high. The statement representative of the signal NBUFA20 says that the only user permitted is the buffer store is not true. When this statement is true, the signal representative of this statement must be high to enable AND gate 539A. With the signal NBUFA20 high, then AND gate 539A is enabled which provides a high delayed input signal to AND gate 547A which in turn is enabled in a manner previously discussed and provides a high output signal NIOCD10. This signal is then applied to the appropriate selection circuitry together with the reconfigured mode signal NRECY and the address bits NBA27 and NBA28 for selecting a particular module. The selection process is similar to the normal mode previously discussed.

Once the MSS has been assigned to either the IOC, CPU or BS and competing units have been locked out as discussed supra the appropriate units must be notified of the assignments. To perform this task hardware is provided for generating assignment flag signals. (See FIG. 9) The assignment flag signals indicate that the CP, BS, or IOC has gained control of the MSS.

Figure 9:
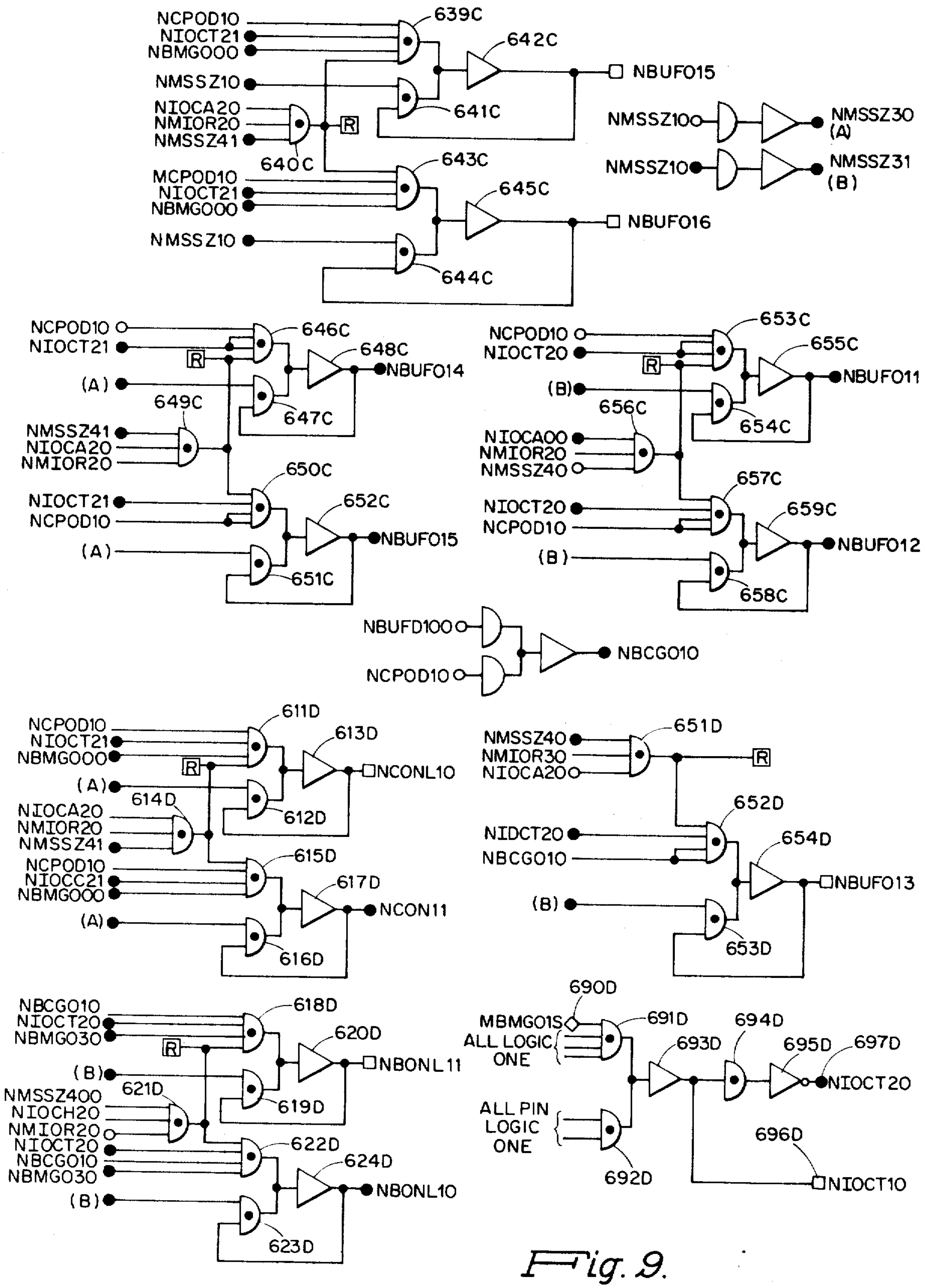
FIG. 9 is a detailed logic block diagram of the assignment flag and override network.

Referring to FIG. 9 it will be shown by example how one of these assignment signals is generated. Three signals are applied to AND gate 639C—NCPOD10, NIOCT21, NBMGO00. According to our convention adopted for this instant application when the statement NCPOD is true (indicated by second to the last bit being odd) then the signal NCPOD10 is high; when the statement NIOCT is not true (again indicated by an even number for the second to the last bit) then the signal MIOCT21 is high; similarly the signal NBMG0 on the third leg of AND gate 639C is high when the statement representative of that signal is not true i.e. when NBMGO is not present then that signal is high. (The statement or function representative by the signal NCPOD is the CP Go delay signal; the function or statement representative of NIOCT is the IOC Go signal derived from a timing signal; the function or statement representative of the NBMGO signal is the buffer Go signal). Gate 640C is enabled when the three signals NIOCA, NMIOR, NMSSZ are high. These signals are high when the statement representative of these signals are not true as indicated by next to last bit being even. The statement or function represented by signal NIOCA is IOC only; the statement or function represented by signal NMIOR is a request to reserve the MSS for the IOC even though the IOC has not issued a Go signal. When all these statements are not true then the signal representative of these statements applied to AND gate 640C are high. With these signals high AND gate 640C is enabled and applies a high signal as a fourth input to AND gates 639C and 643C. Hence AND gate 639C is enabled which applies a high signal to amplifier 642C which in turn generates the NBUFO15 signal which says that the statement is true that the MSS is assigned to the buffer and therefore the signal is high. The signal will remain high as long as the NMSSZ signal or MSS busy signal is applied as one input to AND gate 641C. The other input of AND gate 641C is the feed-back of the NBUFO signal. (It was seen previously how the MSS busy signal (NMSSZ) was generated; here one application of the MSS busy signal (NMSSZ) to exclude competing units from acquiring control of the MSS, is shown.

Once a particular unit such as the IOC, or CPU has acquired control of the MSS, it has been shown with respect to FIG. 3 that the MSS may issue a Go signal to the main memory module address.

However there are times when it is desirable to override the assignment to either the CPU or the buffer store and give control of the MSS to the IOC. This may be done even though the CPU or the BS has been assigned the MSS, but it must be done before the MSS has issued a busy signal which locks out other units. The over-ride hardware for performing this task is shown on FIGS. 6 and 9. Refer now to FIGS. 6 and 9 and assume that the CPU or BS has issued a Go signal which has been received by the MSS before receiving a Go signal from any other competing unit, but because the particular main memory module desired is not available the CPU or BS unit is waiting on that module to become available. Further assume that while the CPU or BS is waiting for the memory module to become available the IOC desires to obtain control of the MSS and enter the main memory when it no longer is busy. Under these conditions even though the CP or BS issued a Go signal and it was received by the MSS before receiving the Go signal of the IOC unit, it is possible to over-ride the Go signal of the CPU or BS and deliver control of the MSS to the IOC unit when the memory module desired becomes available.

To illustrate by example refer again to FIGS. 9 and 7 and more particularly the gate 624D, and assume that the BS has requested service from module 0 of MMS, but module 0 is busy. This is indicated at AND gate 603A of the module select network of FIG. 7 as follows: signal NBONL10, which indicates that the BS is assigned control of the MSS, is high; signal BNA2840 indicates that buffer address bit 28 is not true; (the top input terminal of AND gate 603A is high when either output of AND gates 601A or 602A are high), in this example signal BNA2740 is high since the statement it represents is true and says that buffer address bit 27 is not true (i.e., is 0), moreover signal NRECN13 indicating the mode of operation is in the normal mode and not the reconfigured mode, is high; hence AND gate 601A is enabled making the top input terminal of AND gate 603A high. However the assumption was made for this example that the buffer desired to access module 0 but that module 0 was busy, signal MNBZ000 on AND gate 603A is low and therefore AND gate 604A is not enabled and signal NMG001T is low, and the main memory module 0 Go signal is not issued i.e., module 0 cannot be accessed.

Assume now that at one clock time later the IOC makes a request for access to the same memory module on which the BS is waiting. It has been seen that the BS has been assigned control of the MSS and waiting on the MMS; the IOC under these conditions can override the BS control of the MSS and take control and access module 0 of the MMS when it becomes available. Referring to FIG. 9 an IOC Go signal MBMGO1S is applied to one input terminal of AND gate 691D through a pin 690D. When all other input signals coming from the IOC and applied to AND gate 691D are high it becomes enabled thus applying a high input signal to amplifier 693D. At the output of amplifier 693D the signal divides into two paths. One path takes the signal through inverter 695D producing a signal NIOCT20 which is low, whereas the other path produces a signal NIOCT10 which is high. The signal NIOCT20 is applied to one input terminal of AND gate 622D thus disabling AND gate 622D and causing the signal NBONL10 which indicates the BS is assigned control of the MSS, to go low. This low NBONL10 signal is applied to AND gate 603A (FIG. 7) which as was previously shown was high waiting for MNBZ000, (the signal indicative that module 0 of the MMS is busy), to go high. However at this point in time since the signal NBONL10 is low, the BS no longer has control of the MSS and even if the MNBZ000 signal were to become high indicating module 0 is no longer busy, the BS could not access MMS. Thus it is seen how the IOC has prevented the BS from accessing MMS. It will now be shown, by example, how the IOC obtains control.

Referring again to FIG. 9 it was shown how two NIOCT signals were generated at pins 696D and 697D one true one false. The signal which is high NI0CT10 is applied to input terminals of AND gates 501A and 541A of FIG. 5A. The signal NRECN34 is high since this is not a reconfigured mode and also NBUFA20 will be high since the statement representation of that signal (i.e., buffer is the only user of the MSS, not) is true. With both signals NRECN34 and NBUFA20 applied to AND gate 540A it will be enabled thus applying another high signal as an input to AND gate 541A. Hence both input signals to AND gate 541A are high thus enabling it and providing a high signal to variable delay line 543A via amplifier 542A, which high signal is then applied to one input terminal of AND gate 547A. The other input terminal of AND gate 547A is high if any of AND gates 546A, 549A or 550A are high. Assuming the IOC desires to do a read operation; then AND gate 549A is enabled when signal NIWBK20 becomes high. The high signal from one leg AND gate 549A is applied to another input terminal of AND gate 547A thus enabling it, and generating the signal NI0CD10 via amplifier 548A. Signal NI0CD10 (i.e., IOC Go signal delayed) is applied to AND gate 608A of FIG. 7. The other input signals applied to AND gate 608A will also be high. These input signals are as follows: NRECN13 indicating normal mode of operation for main memory; MBA2740 and MBA2840 indicating IOC address bits 27 and 28 are both high and therefore selecting MMS module 0. With all inputs of AND gate 608A high it will be enabled applying a high input signal to AND gate 605A. When the other input signal on AND gate 605A MNBZ000 becomes high (i.e., MMS module 0 not busy) then it will be enabled permitting the IOC to gain control of the MMS module 0. Thus it is seen how the IOC can override and obtain control of the MSS and MMS.

In attempting to override control of the CPU or BS, however, it is possible for MMS module 0 to become available during the interval that the IOC is in the process of overriding the CPU or BS. Under these conditions a period of indecision and possible wrong indication as to who has gained access to main memory and is being serviced by MSS would result. Consider for example the following set of conditions which would give a false indication. A main memory module Go signal for module 0 NMG0010 is issued through AND gate 610A and amplifier 612A when MNBZ000 signal (i.e., MMS module 0 busy not) becomes high, during the period the MSS is assigned to the BS and during the interval the IOC is attempting to override the BS.

Figure 10:
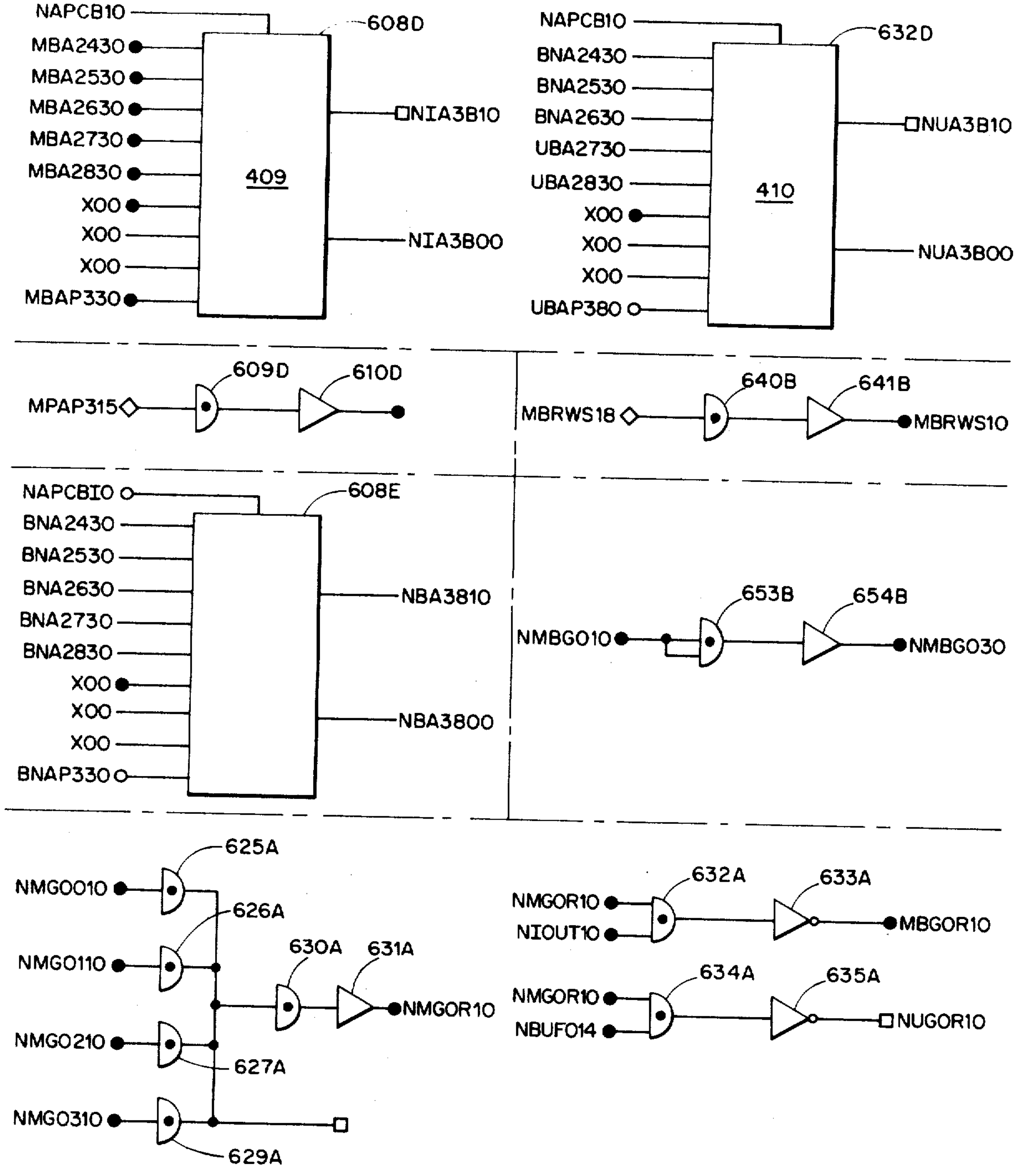
FIG. 10 is a detailed logic block diagram showing various features of the invention.
Figure 11:
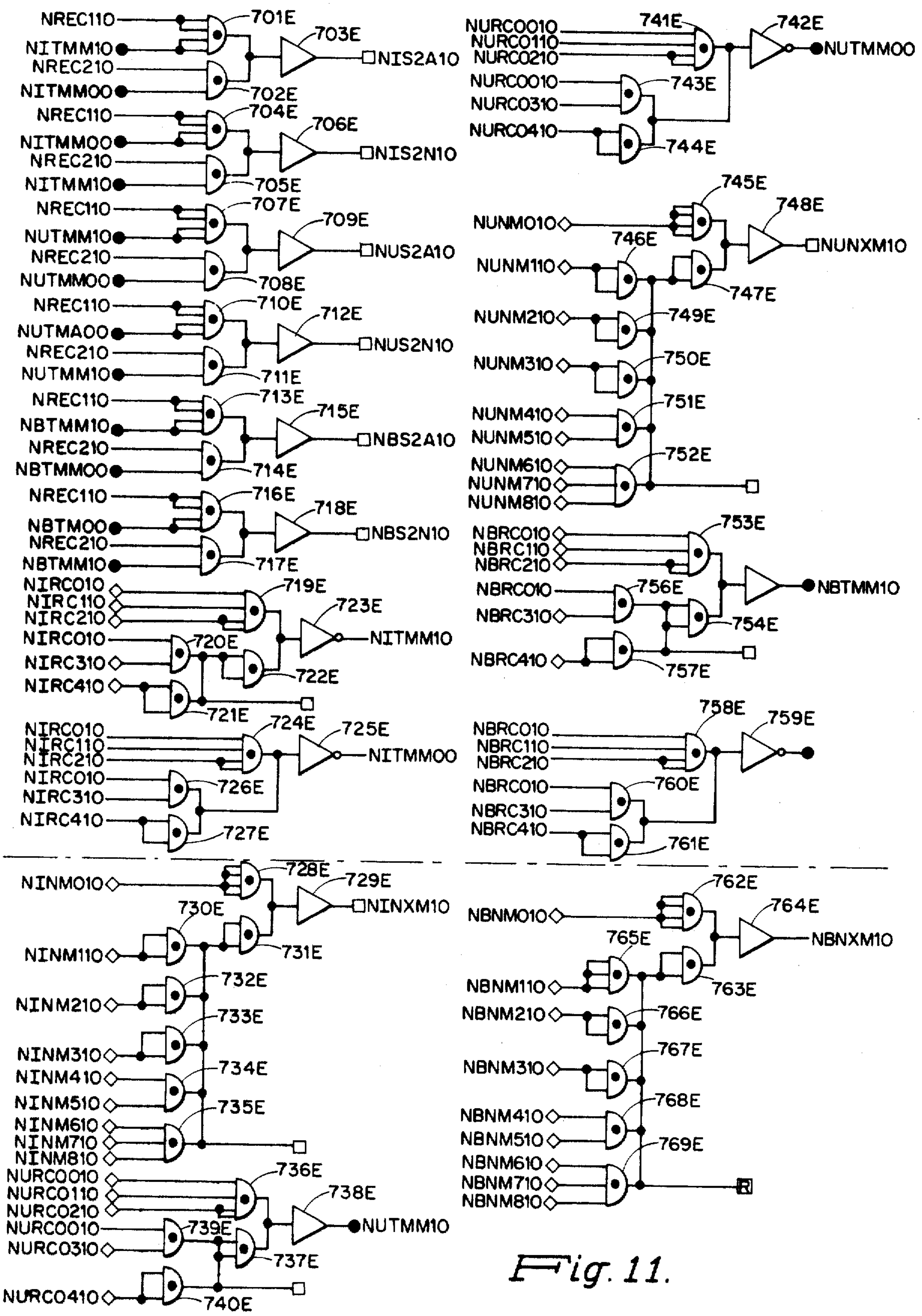
FIG. 11 is a detailed logic block diagram of the reconfiguration network.

Referring to FIG. 10 the NMG0010 signal is applied to AND gate 625A which enables AND gate 630A and generates signal NMG0R10 (i.e., Go reset signal to MMS). The NMG0R10 signal is applied to one input terminal of AND gate 634A, and because the other terminal of AND gate 634A has the signal NBUF014 applied to it and because this is still high, since the MSS is still assigned to the BS, AND gate 634A is enabled issuing a Go reset NUGOR10 signal to the CPU through inverter 635A indicating that the MSS has begun to service the BS when in fact it is the IO that the MSS is about to be serviced. The override assurance network of FIG. 6 prevents this false indication. The function of the override assurance network is to prevent the main memory module busy signal from changing state at that critical period of indecision.

Figures 6A, 6B:
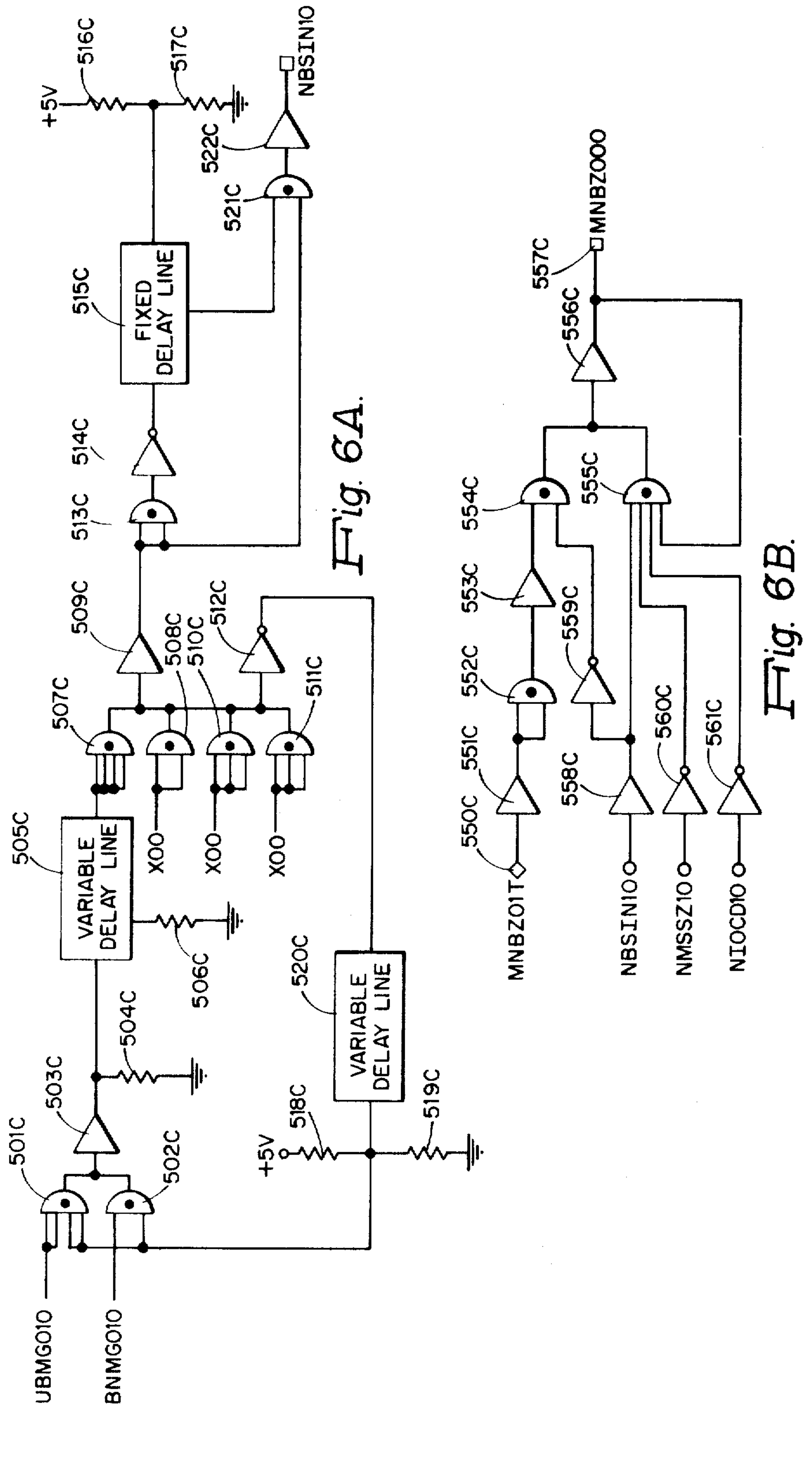
FIGS. 6A + 6B are detailed logic block diagrams of the override ascertain network, for ascertaining that the CPU or BS is overriden by the IOC in any override attempt.
Figure 7:
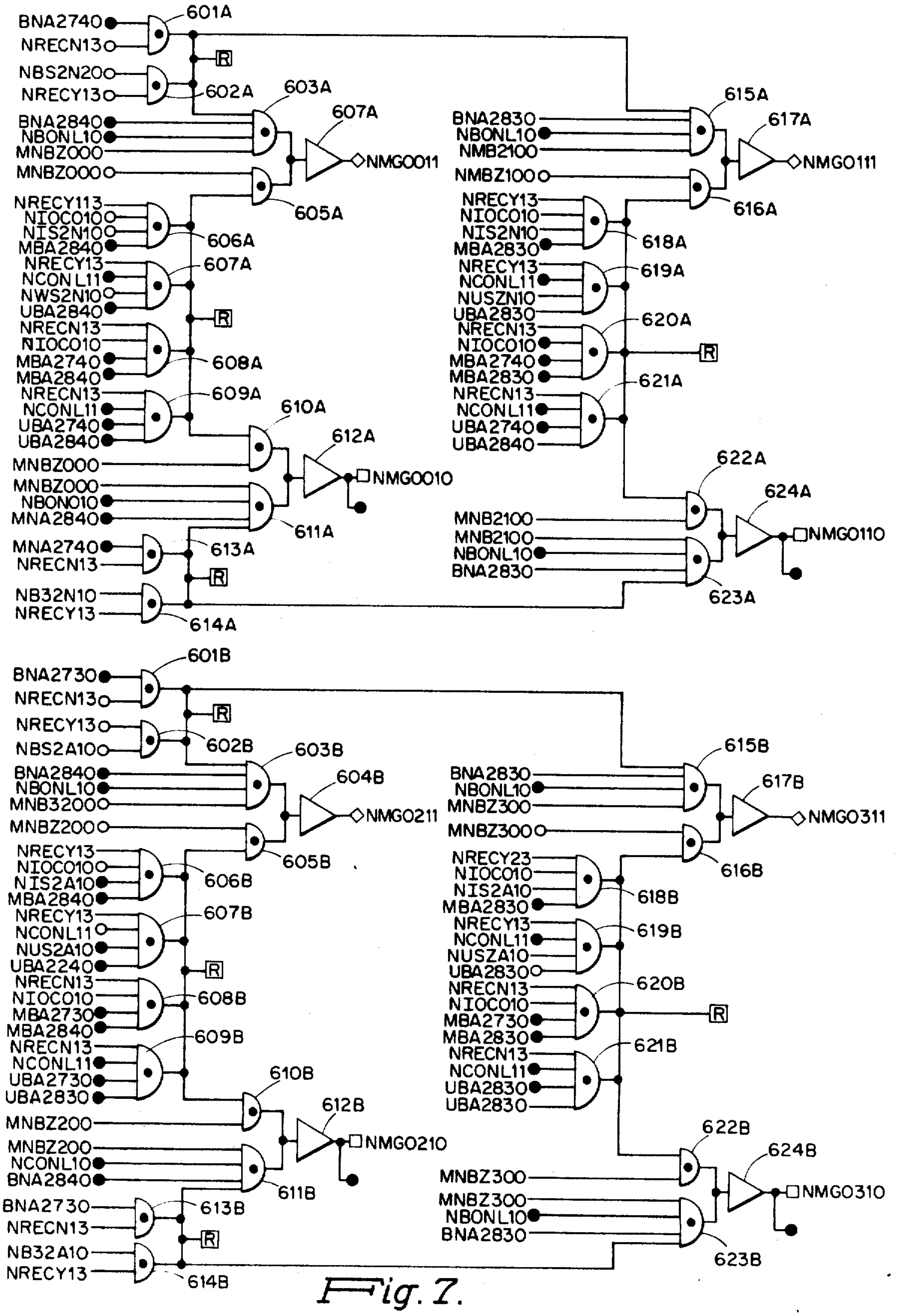
FIG. 7 is a detailed logic block diagram of the module select network.
Figure 8:
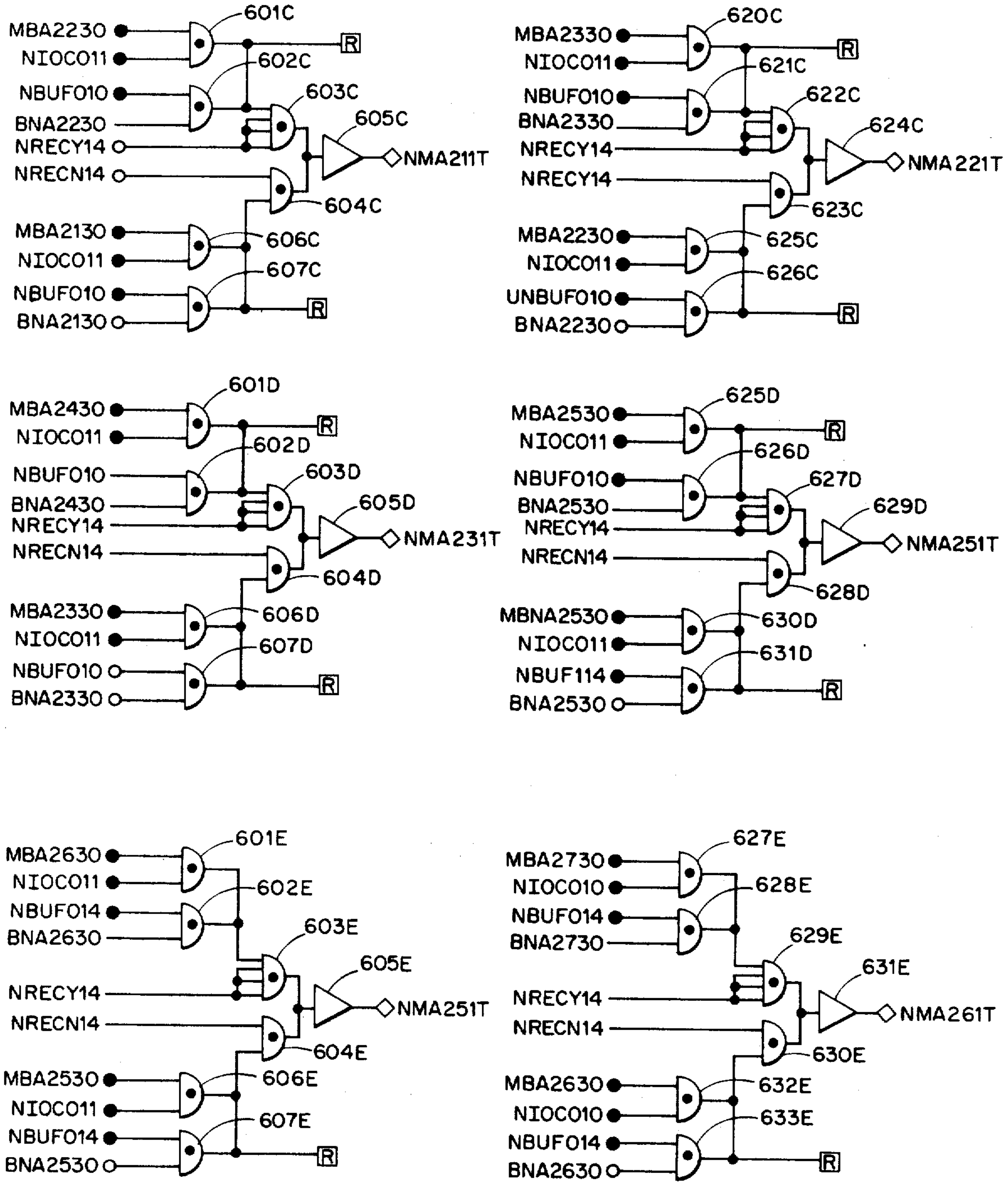
FIG. 8 is a detailed logic block diagram of the address select network.

Referring now to FIG. 6A the Go signal of the CPU or buffer store applied to AND gates 501C or 502C respectively is delayed through variable delay line 505C and is applied to an input terminal of AND gate 507C. Because AND gate 507C has all its input terminals tied together it is enabled when its only input is high. AND gates 508C, 510C and 511C are not utilized in the network indicated by X00. When AND gate 507C is enabled its output signal is applied to amplifier 509C and inverter 512C. The signal from the output of inverter 512C is applied back to AND gates 501C and 502C respectively. Therefore AND gates 501C and 502C are disabled when AND gate 507C is enabled. The variable delay lines 505C and 520C provide a typical loop delay for the loop just described of about 115 nanoseconds. The signal from AND gates 507C which is applied to amplifier 509C and onto the loop comprised of AND gates 513C, 514C, delay line 515C, AND gate 521C and amplifier 522C generates a signal NBSIN10 which is typically delayed by 50 nanoseconds. Hence for every 150 nanoseconds time interval a 50 nanosecond pulse NBSIN10 is generated. (Note that delay line 515C taken in conjunction with the output of amplifier 509C produce a 50 nanosecond pulse whereas variable delay line 505C taken in conjunction with variable delay line 520C produce a 150 nanosecond delay. The buffer sample inhibit signal (NBSIN) is utilized for a portion of a clock pulse to sample the main memory bus lines 317 shown on FIG. 3, and to apply the signal to a latch circuit FIG. 6B to maintain the state of the busy lines in the state that they were found i.e., if the busy lines were busy it would maintain them in a busy state and if they were not busy it would maintain them in a not busy state for an extension of approximately 15 nanoseconds beyond the clock pulse). This would provide a sufficient time to eliminate any uncertainty period during the time when the IOC desired to over-ride the CPU or buffer store; therefore the busy lines are not activated to to switch state and indicate the MSS is busy, thus locking out the IOC before it has a chance to over-ride the CPU or BS.

Referring to FIG. 6B the signal NBSIN10 is applied to amplifier 558C and inverter 559C. The signal from amplifier 558C is applied to one input terminal of AND gate 555C. Amplifier 556C together with AND gate 555C form a latch circuit which permits the MMS module 0 busy not signal MNBZ000 to be stored and circulate in the latch circuit as long as all input signals to AND gate 555C remain high. If on the other hand the MMS module 0 is busy (i.e., signal MNBZ000 is low and MNBZ01T is high) the inverted signal NBSIN10 through inverter 559C will disable AND gate 554C causing signal MNBZ000 to be low, indicating MMS module 0 is busy, and this indication will remain so long as signal NBSIN10 is high which is typically 50 nanoseconds—a time sufficient to overcome the critical period of indecision.

Having shown and described a preferred embodiment of the invention, those skilled in the art will realize that many variations and modifications may be made to produce the described invention and still be within the spirit and scope of the claimed invention.

GLOSSARY OF TERMS

| SIGNAL LOGIC NAME | DEFINITIONS |
|---|---|
| NBUFØ11 | BUFFER OR CP ASSIGNED FLAG SIGNAL 1 |
| NBUFØ12 | " " " 2 |
| NBUFØ13 | " " " 3 |
| NBUFØ15 | " " " 5 |
| NBUFØ16 | " " " 6 |
| NMA211R | MMS ADDRESS BITS 21 |
| NMA221R | " " " 22 |
| NMA231R | " " " 23 |
| NMG0Ø1Ø | MAIN MEMORY MODULE Ø GO SIGNAL |
| NMG011Ø | " " " 1 GO SIGNAL |
| NMG021Ø | " " " 2 GO SIGNAL |
| NMG031Ø | " " " 3 GO SIGNAL |
| MNBZØØØ | MAIN MEMORY MODULE Ø BUSY-NOT |
| MNBZ1ØØ | " " " 1 BUSY-NOT |
| MNBZ2ØØ | " " " 2 BUSY-NOT |
| MNBZ3ØØ | " " " 3 BUSY-NOT |
| UBAP33Ø | CP ADDRESS PARITY BIT 3 |
| NUA3B1Ø | CP ADDRESS BYTE 2 PARITY CHECK |
| UBA283Ø | CP ADDRESS BIT 28 |
| NCONL1Ø | CP ONLY ASSIGNED FLAG SIGNAL |
| NCPOD1Ø | CP GO DELAYED |
| NUS2N1Ø | CP LOWER MODULE SELECT FOR RECONFIGURED MODE |
| NUS2A1Ø | CP UPPER MODULE SELECT'FOR RECONFIGURED MODE |

| SIGNAL LOGIC NAME | DEFINITIONS |
|---|---|
| NUGOR1Ø | CP GO RESET SIGNAL |
| MBAP23Ø | IOC ADDRESS PARITY CHECK BIT 2 |
| NIA3B1Ø | IOC ADDRESS BYTE 3 PARITY CHECK |
| NIOCØ1Ø | IOC CONTROL FUNCTION ASSIGNMENT FLAG |
| NIOCA2Ø | IOC ALONE NOT |
| NMIOR2Ø | IOC RESERVATION NOT |
| NIOCD1Ø | IOC GO DELAYED |
| NIS2N1Ø | IOC LOWER MODULE SELECT FOR RECONFIGURED MODE |
| NIS2A1Ø | IOC UPPER MODULE SELECT FOR RECONFIGURED MODE |
| NIOCT1Ø | IOC GO TO MSS |
| NBUFA2Ø | BUFFER ALONE-NOT |
| BNMG01Ø | BUFFER GO |
| BNAP33Ø | BUFFER ADDRESS PARITY BIT 3 |
| NBA3B1Ø | BUFFER ADDRESS BYTE 3 PARITY CHECK |
| NBONL11 | BUFFER ONLY ASSIGNMENT FLAG SIGNAL |
| NMBG01Ø | IOC GO SIGNAL TO BUFFER |
| MBRWS1Ø | IOC WRITE SIGNAL |
| NBS2N1Ø | BUFFER LOWER MODULE SELECT FOR RECONFIGURED MODE |
| NBS2A1Ø | BUFFER UPPER MODULE SELECT FOR RECONFIGURED MODE |
| NRECN13 | RECONFIGURATION MODE NOT |
| NRECY13 | MMS RECONFIGURED YES (Amplifier 3) |
| NRECN14 | MMS NON-RECONFIGURED MODE |
| NRECY14 | MMS RECONFIGURED YES (Amplifier 4) |
| NMSSZ1Ø | MMS BUSY |
| NAPCB1Ø | ADDRESS PARITY CHECK INHIBIT |
| NIAPC1Ø | IOC ADDRESS PARITY CHECK INHIBIT |
| NAPMD1Ø | ADDRESS PARITY MODE |
| NAP3Ø1Ø | IOC ADDRESS BYTE 3 PARITY CHECK |
| NMSSZ42 | MSS NOT BUSY |
| UBA273Ø | CP ADDRESS BIT 27 |

| SIGNAL LOGIC NAME | DEFINITIONS |
|---|---|
| NMA211T | ADDRESS BIT 21 TO MMS INTERFACE SIGNAL |
| NMA221T | " " 22 TO MMS INTERFACE SIGNAL |
| NMA231T | " " 23 TO MMS INTERFACE SIGNAL |
| NMA241T | " " 24 TO MMS INTERFACE SIGNAL |
| NMA251T | " " 25 TO MMS INTERFACE SIGNAL |
| NMA261T | " " 26 TO MMS INTERFACE SIGNAL |
| NMG0Ø1T | INTERFACE GO SIGNAL TO MSS MODULE 0 |
| NMG011T | " " " " " " 1 |
| NMG021T | " " " " " " 2 |
| NMG031T | " " " " " " 3 |
| XN21 | INTERFACE GO SIGNAL NOT USED TO MSS MODULE |
| XN21 | " " " " " " " " |
| MBA211S | IOC ADDRESS TO MSS BIT 21 |
| NMG0R1S | GENERAL GO RESET INTERNAL MSS |
| MBA221S | IOC ADDRESS BIT 22 TO MSS |
| MBA231S | " " " 23 TO MSS |
| MBA241S | " " " 24 TO MSS |
| MBA251S | " " " 25 TO MSS |
| MBA261S | " " " 26 TO MSS |
| MBA271S | " " " 27 TO MSS |
| MBA281S | " " " 28 TO MSS |
| NXU | NOT USED |
| MBAP21S | IOC ADDRESS PARITY BIT 2 TO MSS |
| MBAP31S | " " " " 3 TO MSS |
| MBG0R1S | MSS GO RESET TO IOC |
| MBRWS1S | IOC READ OR WRITE TO MSS |
| MBMG01S | IOC GO SIGNAL THRU MSS TO BUFFER |
| MMP481Ø | IOC WRITE DATA TO THE PARITY CHECKER BIT 48 |
| MMP491Ø | " " " " " " " " 49 |
| MMP501Ø | " " " " " " " " 50 |
| MMP511Ø | " " " " " " " " 51 |

| SIGNAL LOGIC NAME | DEFINITIONS |
|---|---|
| MMP521Ø | IOC WRITE DATA TO THE PARITY CHECKER BIT 52 |
| MMP531Ø | " " " " " " " " 53 |
| MMP541Ø | " " " " " " " " 54 |
| NBCG01Ø | BUFFER OR CPU GO |
| MMP551Ø | IOC WRITE DATA TO THE PARITY CHECKER BIT 55 |
| MMP561Ø | " " " " " " " " 56 |
| MMP571Ø | " " " " " " " " 57 |
| MMP581Ø | " " " " " " " " 58 |
| MMP591Ø | " " " " " " " " 59 |
| MMP6Ø1Ø | " " " " " " " " 60 |
| MMP611Ø | " " " " " " " " 61 |
| MMP621Ø | " " " " " " " " 62 |
| MMP631Ø | " " " " " " " " 63 |
| MMPP71Ø | IOC WRITE DATA PARITY CHECK BYTE 7 |
| NIBPØ1Ø | IOC BYTE Ø PARITY ERROR CHECK |
| NIBP11Ø | " " 1 " " " |
| NIBP21Ø | " " 2 " " " |
| NIBP31Ø | " " 3 " " " |
| NIBP41Ø | " " 4 " " " |
| NIBP51Ø | " " 5 " " " |
| MMBP61Ø | IOC WRITE DATA BYTE 6 PARITY |
| NBBPØ1Ø | BUFFER BYTE Ø PARITY ERROR CHECK |
| NBBP11Ø | " " 1 " " " |
| NBBP21Ø | " " 2 " " " |
| NBBP31Ø | " " 3 " " " |
| NBBP41Ø | " " 4 " " " |
| NBBP51Ø | " " 5 " " " |
| NBBP61Ø | " " 6 " " " |
| NBBP71Ø | " " 7 " " " |
| BNP481Ø | CP WRITE DATA TO THE PARITY CHECKER BIT 48 |
| BNP491Ø | " " " " " " " " 49 |

| SIGNAL LOGIC NAME | DEFINITIONS |
|---|---|
| BNP501Ø | CP WRITE DATA TO THE PARITY CHECKER BIT 50 |
| BNP511Ø | " " " " " " " " 51 |
| BNP521Ø | " " " " " " " " 52 |
| BNP531Ø | " " " " " " " " 53 |
| BNP541Ø | " " " " " " " " 54 |
| BNP551Ø | " " " " " " " " 55 |
| BNP561Ø | " " " " " " " " 56 |
| BNP571Ø | " " " " " " " " 57 |
| BNP581Ø | " " " " " " " " 58 |
| BNP591Ø | " " " " " " " " 59 |
| BNP601Ø | " " " " " " " " 60 |
| BNP611Ø | " " " " " " " " 61 |
| BNP621Ø | " " " " " " " " 62 |
| BNP631Ø | " " " " " " " " 63 |
| BNPP71Ø | CP WRITE DATA PARITY CHECK BYTE 7 |
| NICYC1Ø | IOC CYCLE INTERNALLY GENERATED |
| NCCYC1Ø | CP CYCLE INTERNALLY GENERATED |
| NBCYC1Ø | BUFFER CYCLE INTERNALLY GENERATED |
| NIETM1Ø | IOC WRITE ABORT LATCH |
| NINET1Ø | IOC RETRYABLE ERROR LATCH |
| NIAPB1Ø | IOC PARITY CHECK INHIBIT |
| MNIME1Ø | IOC MASK PARITY ERROR |
| NIWES1Ø | NON-RETRYABLE ERROR STROBE |
| NIOCØ34 | IOC CONTROL SIGNAL TO MSS |
| NCETM1Ø | CP WRITE ABORT LATCH |
| NCNET1Ø | CP RETRYABLE ERROR LATCH |
| NUAPB1Ø | CP PARITY CHECK INHIBIT |
| MNCME1Ø | CP MASK PARITY ERROR |
| NCWES1Ø | NON-RETRYABLE ERROR STROBE |
| NCPØØ36 | CP ASSIGNED CONTROL OF THE MSS |

| SIGNAL LOGIC NAME | DEFINITIONS |
|---|---|
| MNWAB1Ø | IOC WRITE ABORT |
| UBWAB3Ø | CPU WRITE ABORT |
| UNINT3Ø | CP INITIALIZE |
| NIDPC11 | INHIBIT DATA PARITY CHECK |
| NBETM1Ø | BUFFER WRITE ABORT LATCH |
| NMAKCØØ | MEMORY ACKNOWLEDGE CONTROL NOT |
| NIAKS2Ø | IOC ACKNOWLEDGE NOT |
| NBAKS2Ø | BUF. " " |
| NCAKS2Ø | CPU " " |
| NINXM1Ø | IOC NON-EXISTENT MEMORY CHECK |
| NIOCT1Ø | IOC GO SIGNAL |
| NUNXM1Ø | CP NON-EXISTENT MEMORY CHECK |
| NCPØØ16 | CP ASSIGNED CONTROL OF THE MSS |
| NBNXM1Ø | BUFFER NON-EXISTENT MEMORY CHECK |
| NBUFØ15 | BUFFER ASSIGNED CONTROL OF THE MSS |
| NUSEC1Ø | CP SINGLE ERROR CORR. |
| NBNER1Ø | BUFFER NON-RETRYABLE ERROR |
| NBERS1Ø | BUFFER ERROR STROBE |
| NBRER1Ø | BUFFER RE-TRYABLE ERROR |
| NIBP61Ø | IOC BAD BYTE 6 PARITY CHECK |
| NIBP71Ø | " " " 7 " " |
| NBBP61Ø | BUFFER BYTE 6 PARITY ERROR CHECK |
| NBBP71Ø | " " 7 " " " |
| NMACK1Ø | IOC ACKNOWLEDGE |
| NBACK1Ø | BUF. " |
| NUACK1Ø | CPU " |
| NMBZØØØ | MMS MODULE Ø BUSY NOT |
| NMBZ1ØØ | " " 1 " " |
| NMBZ2ØØ | " " 2 " " |
| NMBZ3ØØ | " " 3 " " |

| SIGNAL LOGIC NAME | DEFINITIONS |
|---|---|
| NTACK1Ø | MMS ACKNOWLEDGE WHICH RESETS MSS BUSY |
| NBNEM1Ø | BUFFER NON-EXISTENT MEMORY CHECK |
| NIAPC1Ø | INHIBIT ADDRESS PARITY CHECK |
| NIDPC1Ø | INHIBIT DATA PARITY CHECK |
| NIDPC3Ø | " " " " |
| NBRDS1Ø | BUF/CP READ STROBE |
| NREC11Ø | RECONFIGURATION MODE R1 |
| NREC21Ø | RECONFIGURATION MODE R2 |
| NRECY11 | MMS RECONFIGURATION MODE DRIVER 1 |
| NRECY12 | " " " " 2 |
| NRECY13 | " " " " 3 |
| NRECY14 | " " " " 4 |
| NRECN11 | MMS NON-RECONFIGURATION MODE DRIVER 1 |
| NRECN12 | " " " " " 2 |
| NRECN13 | " " " " " 3 |
| NRECN14 | " " " " " 4 |
| NBNET1Ø | BUF. NON-RECONFIGURATION ERROR LATCH STROBE 1 |
| MBAØ83Ø | IOC TO MSS ADDRESS BIT 8 |
| MBAØ930 | " " " " " 9 |
| MBA1Ø3Ø | " " " " " 10 |
| MBA113Ø | " " " " " 11 |
| MBA123Ø | " " " " " 12 |
| MBA133Ø | " " " " " 13 |
| MBA143Ø | " " " " " 14 |
| NBS2A1Ø | BUF. UPPER MODULE SELECT IN RECONFIGURED MODE |
| NBS2N1Ø | BUF. LOWER MODULE SELECT IN RECONFIGURED MODE |
| NINXM1Ø | IOC NON-EXISTENT MEMORY CHECK |
| NUNXM1Ø | CP " " " " |
| NBNXM1Ø | BUF. " " " " |
| NINM21Ø | IOC NON-EXISTENT MEMORY CHECK BIT 2 |

| SIGNAL LOGIC NAME | DEFINITIONS |
|---|---|
| NINM11Ø | IOC NON-EXISTENT MEMORY CHECK BIT 1 |
| NINMØ1Ø | " " " " " " Ø |
| XØØ | GROUND |
| NRCG1ØØ | LOGICAL 1 |
| MBAØ83Ø | IOC TO MSS ADDRESS BIT 8 |
| MBAØ93Ø | " " " " " 9 |
| MBA1Ø3Ø | IOC TO MSS ADDRESS BIT 1Ø |
| MBA113Ø | " " " " " 11 |
| MBA123Ø | " " " " " 12 |
| MBA133Ø | " " " " " 13 |
| MBA143Ø | " " " " " 14 |
| NIRCØ1Ø | IOC RECONFIGURATION BIT 0 |
| NIRC11Ø | " " " 1 |
| NIRC21Ø | " " " 2 |
| NIRC31Ø | " " " 3 |
| NIRC41Ø | " " " 4 |
| NUNM21Ø | CP NON-EXISTENT MEMORY CHECK BIT 2 |
| NUNM11Ø | " " " " " " 1 |
| NUNMØ1Ø | " " " " " " Ø |
| NURCØ1Ø | CP RECONFIGURATION BIT Ø |
| NURC11Ø | " " " 1 |
| NURC21Ø | " " " 2 |
| NURC31Ø | " " " 3 |
| NURC41Ø | " " " 4 |
| NBNM21Ø | BUFFER NON-EXISTENT MEMORY CHECK BIT 2 |
| NBNM11Ø | " " " " " " 1 |
| NBNMØ1Ø | " " " " " " Ø |
| NBRC21Ø | BUFFER RECONFIGURATION BIT 2 |
| BNA143Ø | CP/BUFFER ADDRESS BIT 14 |
| NBAC11Ø | BUFFER RECONFIGURATION BIT 1 |
| NBRCØ1Ø | " " Ø |

| SIGNAL LOGIC NAME | DEFINITIONS |
|---|---|
| NBRC31Ø | BUFFER RECONFIGURATION BIT 3 |
| NBRC41Ø | " " " 4 |
| NINM31Ø | IOC NON-EXISTENT MEMORY CHECK BIT 3 |
| NINM41Ø | " " " " " " 4 |
| NINM51Ø | " " " " " " 5 |
| NINM81Ø | " " " " " " 8 |
| NINM71Ø | " " " " " " 7 |
| NINM61Ø | " " " " " " 6 |
| NUNM41Ø | CP NON-EXISTENT MEMORY CHECK BIT 4 |
| NUNM51Ø | " " " " " " 5 |
| NUNM31Ø | " " " " " " 3 |
| NUNM81Ø | " " " " " " 8 |
| NUNM71Ø | " " " " " " 7 |
| NUNM61Ø | " " " " " " 6 |
| NBNM41Ø | BUFFER NON-EXISTENT MEMORY CHECK BIT 4 |
| NBNM51Ø | " " " " " " 5 |
| NBNM81Ø | " " " " " " 8 |
| NBNM71Ø | " " " " " " 7 |
| NBNM61Ø | " " " " " " 6 |
| NUMRE1S | MMS TO CP READ DATA ERROR |
| NURER1S | MMS TO CP RETRYABLE ERROR |
| NUNER1S | MMS TO CP NON-RETRYABLE ERROR |
| NUWRC1S | MMS TO CP WRITE CANCELLED |
| UNMMN1S | CP MODE REQUEST (-1) |
| UNMMØ1S | CP MODE REQUEST Ø |
| UNMM11S | CP MODE REQUEST 1 |
| UNMM21S | CP MODE REQUEST 2 |
| NUNEM1S | MMS TO CP NON-EXISTENT MEMORY |
| UNR241S | CP TO MMS RECONFIGURED MODE |
| UNRC11S | CP TO MMS RECONFIGURED MODE |
| NMACK1S | MMS TO I/O MEMORY ACKNOWLEDGE |

| SIGNAL LOGIC NAME | DEFINITIONS |
|---|---|
| NMRDS1S | MMS TO I/O READ STROBE |
| NMRER1S | MMS TO I/O RETRYABLE STROBE |
| NMNER1S | MMS TO I/O NON-RETRYABLE ERROR |
| NMERS1S | MMS TO I/O ERROR STROBE |
| NMWRC1S | MMS TO I/O WRITE CANCELLED |
| MNACK1T | MMS TO MSS ACKNOWLEDGE INTERFACE SIGNAL |
| MNRDS1T | MMS TO MSS READ STROBE INTERFACE SIGNAL |
| MNRER1T | MMS TO MSS RETRYABLE ERROR INTERFACE SIGNAL |
| MNNER1T | MMS TO MSS NON-RETRYABLE ERROR INTERFACE SIGNAL |
| MNERS1T | MMS TO MSS ERROR STROBE INTERFACE SIGNAL |
| MNWRC1T | MMS TO MSS WRITE CANCELLED INTERFACE SIGNAL |
| MNSEC1T | MMS TO MSS SINGLE ERROR CORRECT INTERFACE SIGNAL |
| NMMMØ1T | MSS TO MMS DIAGNOSTIC MODE BIT 0 INTERFACE SIGNAL |
| NMMM11T | MSS TO MSS DIAGNOSTIC MODE BIT 1 INTERFACE SIGNAL |
| NMMM21T | MSS TO MMS DIAGNOSTIC MODE BIT 2 INTERFACE SIGNAL |
| MNBZØ1T | MMS TO MSS MODULE 0 BUSY INTERFACE SIGNAL |
| MNBZ11T | " " " " 1 " " " |
| MNBZ21T | " " " " 2 " " " |
| MNBZ31T | " " " " 3 " " " |
| BNAØ83Ø | CPU/BUFFER TO MSS ADDRESS BIT 8 |
| BNAØ93Ø | " " " " " " 9 |
| BNA1Ø3Ø | " " " " " " 10 |
| BNA113Ø | " " " " " " 11 |
| BNA123Ø | " " " " " " 12 |
| BNA133Ø | " " " " " " 13 |
| BNA143Ø | " " " " " " 14 |
| BNA153Ø | " " " " " " 15 |
| BNA163Ø | " " " " " " 16 |
| BNA173Ø | " " " " " " 17 |
| BNA183Ø | " " " " " " 18 |
| BNA193Ø | " " " " " " 19 |

| SIGNAL LOGIC NAME | DEFINITIONS |
|---|---|
| BNA2Ø3Ø | CPU/BUFFER TO MSS ADDRESS BIT 20 |
| BNA213Ø | " " " " " " 21 |
| BNA223Ø | " " " " " " 22 |
| BNA233Ø | " " " " " " 23 |
| MBAØ83Ø | IOC TO MSS ADDRESS BIT 8 |
| MBAØ93Ø | " " " " " 9 |
| MBA1Ø3Ø | " " " " " 10 |
| MBA113Ø | " " " " " 11 |
| MBA123Ø | " " " " " 12 |
| MBA133Ø | " " " " " 13 |
| MBA143Ø | " " " " " 14 |
| MBA153Ø | " " " " " 15 |
| MBA163Ø | " " " " " 16 |
| MBA173Ø | " " " " " 17 |
| MBA183Ø | " " " " " 18 |
| MBA193Ø | " " " " " 19 |
| MBA2Ø3Ø | " " " " " 20 |
| MBA213Ø | " " " " " 21 |
| MBA223Ø | " " " " " 22 |
| MBA233Ø | " " " " " 23 |
| MBA243Ø | " " " " " 24 |
| MBA253Ø | " " " " " 25 |
| MBA263Ø | " " " " " 26 |
| MBA273Ø | " " " " " 27 |
| MBA283Ø | " " " " " 28 |
| NBAPB1Ø | BUFFER ADDRESS PARITY CHECK |
| NIAPB1Ø | IOC " " " |
| NUAPB1Ø | CPU " " " |
| MBAP11S | IOC ADDRESS BYTE 1 PARITY BIT |
| MBAP23Ø | " " " 2 " " |

| SIGNAL LOGIC NAME | DEFINITIONS |
|---|---|
| NIA1B1Ø | IOC ADDRESS BYTE 1 PARITY CHECK |
| NIA2B1Ø | " " " 2 " " |
| NIA3B1Ø | " " " 3 " " |
| NIAPC1Ø | INHIBIT ADDRESS PARITY CHECK |
| NAP1Ø1Ø | MMS ADDRESS BYTE 1 PARITY CHECK |
| NAP2Ø1Ø | " " " 2 " " |
| BNAP13Ø | BUFFER ADDRESS BYTE 1 PARITY BIT |
| BNAP23Ø | " " " 2 " " |
| NBA1B1Ø | BUFFER ADDRESS BYTE 1 PARITY CHECK |
| NBA2B1Ø | " " " 2 " " |
| NBA3B1Ø | " " " 3 " " |
| UNMKØ3Ø | CP WRITE MASK BIT 0 |
| UNMK13Ø | " " " " 1 |
| UNMK23Ø | " " " " 2 |
| UNMK33Ø | " " " " 3 |
| UNMK43Ø | " " " " 4 |
| UNMK53Ø | " " " " 5 |
| UNMK63Ø | " " " " 6 |
| UNMK73Ø | " " " " 7 |
| NNP481Ø | MAIN MEMORY DATA PARITY CHECK BIT 48 |
| NNP491Ø | " " " " " " 49 |
| NNP5Ø1Ø | " " " " " " 50 |
| NNP511Ø | " " " " " " 51 |
| NNP521Ø | " " " " " " 52 |
| NNP531Ø | " " " " " " 53 |
| NNP541Ø | " " " " " " 54 |
| NNP551Ø | " " " " " " 55 |
| NNP561Ø | " " " " " " 56 |
| NNP571Ø | " " " " " " 57 |
| NNP581Ø | " " " " " " 58 |
| NNP591Ø | " " " " " " 59 |

| SIGNAL LOGIC NAME | DEFINITIONS |
|---|---|
| NNP6Ø1Ø | MAIN MEMORY DATA PARITY CHECK BIT 60 |
| NNP611Ø | " " " " " " 61 |
| NNP621Ø | " " " " " " 62 |
| NNP631Ø | " " " " " " 63 |
| NNPP71Ø | MAIN MEMORY DATA PARITY CHECK BYTE 7 |
| NNPP61Ø | " " " " " " 6 |
| MNWRB1Ø | IOC WRITE ABORT |
| NMIOR2Ø | IOC RESERVATION NOT |
| MBRWS1Ø | IOC READ/WRITE SIGNAL |
| UNRWS1Ø | CP " " " |
| UNINT3Ø | CP INITIALIZE |
| UNWAR3Ø | CP WRITE ABORT |
| NCWAB1Ø | WRITE ABORT |
| NIWAB1Ø | IOC WRITE ABORT |
| NIAPC1Ø | IOC ADDRESS PARITY CHECK INHIBIT |
| MNIME1Ø | IOC NON-RETRYABLE ERROR LATCH |
| UNMXP3Ø | CP WRITE MASK PARITY BIT |
| MNCME1Ø | CP NON-RETRYABLE ERROR LATCH |
| NIDPC1Ø | INHIBIT DATA PARITY CHECK |
| NMBP61Ø | READ DATA BYTE 6 PARITY CHECK |
| NMBP71Ø | " " " 7 " " |
| NIOCD1Ø | IOC GO DELAYED |
| NMAKS1Ø | MEMORY ACKNOLWEDGE SIGNAL |
| NINBY1Ø | IOC CYCLE IN MSS |
| NCPØØ15 | IOC CONTROL FUNCTION |
| NCNBY1Ø | CP CYCLE IN MSS |
| NBUFØ15 | BUFFER CONTROL FUNCTION |
| NBNBY1Ø | BUFFER CYCLE IN MSS |
| NETMS1Ø | CONTROL FROM TIMING |
| NCETR1Ø | CP CONTROL FOR ERROR |
| NIETR1Ø | IOC CONTROL FOR ERROR |

| SIGNAL LOGIC NAME | DEFINITIONS |
|---|---|
| NBETR1Ø | BUFFER CONTROL FOR ERROR |
| NCNET1Ø | CPU NON-RETRYABLE ERROR CONTROL |
| NBNET1Ø | BUFFER N.R. ERROR |
| NIAKS2Ø | IOC ACKNOWLEDGE NOT |
| NCAKS2Ø | CP " " |
| NBAKS2Ø | BUF. " " |
| NIRDS1Ø | IOC READ STROBE |
| NIRDR1Ø | " " CONTROL |
| NCRDS1Ø | CPU READ STROBE |
| NCRDR1Ø | " " CONTROL |
| NBRDS1Ø | BUFFER READ STROBE |
| NBRDR1Ø | " " CONTROL |
| NIRDL1Ø | READ DATA PARITY CONTROL ERROR |
| NCRDL1Ø | " " " " " |
| NIPCS1Ø | IOC READ DATA COMPARE |
| NIPCR1Ø | " " " " CNTL. |
| NCPCS1Ø | CP " " " |
| NCPCR1Ø | CP " " " CNTL. |
| NBPCS1Ø | BUF. " " " |
| NBPCR1Ø | " " " " CNTL. |
| NIPCL1Ø | IOC RETRYABLE ERROR STROBE |
| NCPCL1Ø | CPU " " " |
| NBPCL1Ø | BUF. " " " |
| MMWØØ3Ø | IOC WRITE DATA BIT 0 |
| MMWØ13Ø | " " " " 1 |
| MMWØ23Ø | " " " " 2 |
| MMWØ33Ø | " " " " 3 |
| MMWØ43Ø | " " " " 4 |
| MMWØ53Ø | " " " " 5 |
| MMWØ63Ø | " " " " 6 |
| MMWØ73Ø | " " " " 7 |

| SIGNAL LOGIC NAME | DEFINITIONS |
|---|---|
| MMWØ83Ø | IOC WRITE DATA BIT 8 |
| MMWØ93Ø | " " " " 9 |
| MMW1Ø3Ø | " " " " 10 |
| MMW113Ø | " " " " 11 |
| BNWØØ1Ø | CP WRITE DATA BIT 0 |
| BNWØ11Ø | " " " " 1 |
| BNWØ21Ø | " " " " 2 |
| BNWØ31Ø | " " " " 3 |
| BNWØ41Ø | " " " " 4 |
| BNWØ51Ø | " " " " 5 |
| BNWØ61Ø | " " " " 6 |
| BNWØ71Ø | " " " " 7 |
| BNWØ81Ø | " " " " 8 |
| BNWØ91Ø | " " " " 9 |
| BNW1Ø1Ø | " " " " 10 |
| BNW111Ø | " " " " 11 |
| NNRØØ1Ø | MAIN MEMORY READ DATA BIT 0 |
| NNRØ11Ø | " " " " " 1 |
| NNRØ21Ø | " " " " " 2 |
| NNRØ31Ø | " " " " " 3 |
| NNRØ41Ø | " " " " " 4 |
| NNRØ51Ø | " " " " " 5 |
| NNRØ61Ø | " " " " " 6 |
| NNRØ71Ø | " " " " " 7 |
| NNRØ81Ø | " " " " " 8 |
| NNRØ91Ø | " " " " " 9 |
| NNR1Ø1Ø | " " " " " 10 |
| NNR111Ø | " " " " " 11 |
| MMPØØ1Ø | IOC WRITE DATA PARITY CHECK BIT 0 |
| MMPØ11Ø | " " " " " " 1 |
| MMPØ21Ø | " " " " " " 2 |

| SIGNAL LOGIC NAME | DEFINITIONS |
|---|---|
| MMPØ31Ø | IOC WRITE DATA PARITY CHECK BIT 3 |
| MMPØ41Ø | " " " " " " 4 |
| MMPØ51Ø | " " " " " " 5 |
| MMPØ61Ø | " " " " " " 6 |
| MMPØ71Ø | " " " " " " 7 |
| MMPPØ1Ø | IOC WRITE DATA PARITY CHECK BYTE 0 |
| NNPØØ1Ø | MAIN MEMORY PARITY CHECK BIT 0 |
| NNPØ11Ø | " " " " " 1 |
| NNPØ21Ø | " " " " " 2 |
| NNPØ31Ø | " " " " " 3 |
| NNPØ41Ø | " " " " " 4 |
| NNPØ51Ø | " " " " " 5 |
| NNPØ61Ø | " " " " " 6 |
| NNPØ71Ø | " " " " " 7 |
| NNPPØ1Ø | MAIN MEMORY PARITY CHECK BYTE 0 |
| NMLVC1Ø | IOC WRITE DATA CONTROL |
| NBLVC1Ø | CP WRITE DATA CONTROL |
| NICYCØØ | IOC MEMORY CYCLE |
| NBCYCØØ | BUFFER MEMORY CYCLE |
| MMBPW1Ø | IOC BYTE PARITY |
| NIBPØ1Ø | IOC BAD BYTE PARITY |
| NBBPØ1Ø | BUFFER BAD BYTE PARITY |
| NMBPØ1Ø | MEMORY BAD BYTE PARITY |
| NIDPC1Ø | INHIBIT DATA PARITY CHECK |
| NBNØØ1Ø | BUFFER READ DATA BIT 0 |
| NBNØ11Ø | " " " " 1 |
| NBNØ21Ø | " " " " 2 |
| NBNØ31Ø | " " " " 3 |
| NBNØ41Ø | " " " " 4 |
| NBNØ51Ø | " " " " 5 |
| NBNØ61Ø | " " " " 6 |

| SIGNAL LOGIC NAME | DEFINITIONS |
|---|---|
| NBNØ71Ø | " " " " 7 |
| NBNØ81Ø | " " " " 8 |
| NBNØ91Ø | BUFFER READ DATA BIT 9 |
| NBN1Ø1Ø | " " " " 10 |
| NBN111Ø | " " " " 11 |
| NBUFA20 | BUFFER THE ONLY USER PERMITTED NOT |
| NIOCD10 | IOC GO SIGNAL DELAYED |
| NCPOD10 | CP GO SIGNAL DELAYED |
| NIOCT21 | IOC GO SIGNAL |
| NBMGO00 | BUFFER GO SIGNAL |
| NIOCA1Ø | IOC ONLY |
| NMIOR1Ø | RESERVE MSS FOR THE IOC |
| NMSSZ1Ø | MSS BUSY |
| NBUFO1Ø | MSS ASSIGNED TO BUFFER |
| NBSIN10 | BUFFER SAMPLE INHIBIT SIGNAL |
| NRECY34 | MAIN MEMORY IN RECONFIGURED MODE |
| NRECN34 | MAIN MEMORY IN NORMAL CONFIGURATION MODE |
| NIWBK20 | IOC TO PERFORM WRITE NOT |
| UNMGO10 | GO SIGNAL ISSUED BY THE CPU |

ADDENDUM

FIG. 1, block 100, is a typical main memory of the random access type, typically shown and described in Chapter 7 of "Digital Computer Fundamentals" by Tom C. Bartee, published by McGraw-Hill Company in 1960. See also U.S. Pat. No. 3,380,025.

FIG. 1, block 6, is a typical central processing unit (CPU), typically shown and described in U.S. Pat. No. 3,201,762, issued Aug. 17, 1965 to H. W. Schrimpf, entitled "Electrical Data Processing Apparatus".

FIG. 1, block 7, is a typical INPUT/OUTPUT control unit (IOC) and block 8 is a typical buffer storage (BS) unit typically shown and described in U.S. Pat. No. 3,409,880, issued Nov. 5, 1968 to G. N. Galler, et al; entitled "Apparatus for Processing Data Records in a Computer System". See also copending U.S. Pat. application Ser. No. 295,301 for "Buffer Score" assigned to the same assignee as the instant invention.

FIG. 1, block 9, is the "Priority Resolving Network" (PRN), the details of which are shown on FIGS. 5A and 5B and described in the instant specification.

FIG. 1, block 4, is a less detailed version of the main store sequencer of MSS of block 300A. The details of MSS300-A are shown on FIGS. 5A–11, and described in the specification.

FIG. 3, block 318, entitled "Steering Unit" is a typical demultiplexer, typically shown on Page S5-7 of "TTL Catalog Supplement from Texas Instrument" published March 15, 1970 by Texas Instrument Incorporated.

FIG. 3, block 321, entitled "LOCKOUT" is typically a NAND gate circuit, typically shown on Page 2–15 of "TTL Integrated Circuits Catalog from Texas Instrument" published August 1969 by Texas Instrument Incorporated.

FIG. 3, block 322, entitled "MAIN TIMING" is a typical pulse distribution apparatus, typically described on Pages 306–315 of "Digital Computer Fundamentals" by Thomas C. Hardee.

FIG. 3, block 422, entitled "TIMING AND CONTROL" is a typical control unit, innumerable types of which are found in a book entitled "Microprogramming: Principles and Practices" by Samir S. Husson, published by Prentice Hall Inc.

FIG. 3, PDA CLOCK (Pulse Distribution Amplifier) is a typical system clock, i.e., a multivibrator oscillator, for generating a sequence of pulses. See pages 269–281 of a book entitled "Wave Generating and Shaping" by Leonard Straus, published by McGraw-Hill Book Company. See also Pages 93–96 of a book entitled, "Digital Systems: Hardware Organization and Design", by Frederick J. Hill and Gerlad R. Peterson, published by John Wiley and Sons, Inc., 1973.

FIG. 4A, blocks 407, 408, 409, 410, 413 and 414 are typical parity checking generators as shown on Page 11–1 of "TTL Integrated Circuits Catalog from Texas Instrument" published August 1969 by Texas Instrument Incorporated.

FIG. 4A, blocks 401, 402, and 403 are cable connectors and well known in the art.

FIG. 4A, block 418, entitled "RECONFIGURATION NETWORK" is described in copending Patent Application entitled "Main Memory Reconfiguration" filed on the same date as the instant application and having Ser. No. 295,417.

FIG. 4A, block 419, entitled "Priority Resolution Network" is shown in detail on FIGS. 5A and 9 and described in detail in the specification.

FIG. 4A, block 435, is shown in detail on FIG. 5B and described in the specification in detail.

FIG. 4A, block 421, entitled "Request Steering Network" is a typical demultiplexer, similar to the one indicated on block 318, previously identified. FIG. 4A, block 424, is nothing more than a well known typical storage register.

FIG. 4A, blocks 411, 415, 420, 426, and 427 are multiplexer networks, typically shown on Page S-10 of "TTL Integrated Circuits Catalog Supplement from Texas Instrument" published Mar. 15, 1970 by Texas Instrument Incorporated.

FIG. 4B, block 423, is also a multiplexer network typically shown and described as previously referenced.

FIG. 4B, block 428, is an 8T23 Type line driver shown and described on Page 3–161 of "Signetics Digital Linear MOS Integrated Circuits Catalog," published 1972.

FIG. 4B, blocks 429, 430, 431 and 432 are 8T–14 type triple line receivers shown typically on Page P3–143 of the above referenced "Signetics Catalog".

FIG. 1, delay lines, are shown and described in U.S. Pat. No. 3,599,011, issued Aug. 10, 1971. Delay lines are further described on Pages 99–104 of "Digital Computer Fundamentals" by Thomas C. Bartee, published by McGraw-Hill Company, 1960. A typical variable delay line is described in an article by W. Perzley and M. Fishbein entitled "Digital Function Generator with Portional Delay Lines" published in the Jan. 12, 1962 issue of Electronics XXXV, on Pages 62–65.

What is claimed is:

1. In combination with a main store sequencer (MSS) for processing information between a main memory store (MMS) and a central processing unit (CPU), buffer store (BS) or input/output control unit (IOC) and priority resolving means for resolving priority conflicts for MMS access among the CPU, BS and IOC units, an override assurance network for generating electric rectangular pulse signals for application to an electric latching network to maintain said electrical latching network, during the application of any one of said rectangular pulse signals, in the same state that it was upon the application of any one of said rectangular pulse signals, said override assurance network comprising:

a. a first electrical path having a first input terminal coupled to said CPU, BS, IOC and priority resolving unit for receiving a Go signal from said CPU, BS or IOC indicative of a request for control of said MSS by the CPU, BS or IOC issuing the Go signal, said first electrical path comprising:
   1. first gating means, coupled to said first input terminal, for providing a first gating signal in response to a plurality of signals applied to it,
   2. first delay means, coupled to said first gating means, for imparting a first predetermined timedelay to the Go signal first received by said first and, path, and
   3. first inverting means coupling said first delay means to said first gating means, for inverting the Go signal received by said first electrical loop, whereby said first electrical path generates a first series of rectangular electrical pulses of a first predetermined width in response to the Go signal, b. a second electrical path having a second input terminal coupled to said first latching electrical path for receiving the first series of rectangular electrical pulses from said first electrical path, said second electrical path comprising:
   1. second gating means, coupled to said second input terminal, for providing a second gating signal in response to any one of said first series of rectangular electric pulses,
   2. second inverting means, coupled to said second gating means, for inverting the first series of rectangular electric pulses,
   3. second delay means, coupled to said second inverting means and to said second gating means, for delaying, by a second predetermined amount, the inverted series of pulses in said second electrical path relative to the non-inverted series of pulses in said first electrical network,
   4. combining means coupled to said first electrical path and second electrical path for combining said inverted delayed series of pulses with said non-inverted series of pulses, whereby said inverted delayed series of pulses cancel that portion of non-inverted series of pulses not delayed relative to each other leaving a third series of non-inverted pulses having a second predetermined width, and c. a third electrical path coupled to said first and second electrical paths for issuing electric signals to said priority resolving network indicative of the current state of said MMS.

2. The combination as recited in claim 1 wherein said third electrical path is comprised of:

a. a first electrical latching network having a first input terminal and first output terminal, said electrical latching network further comprising,
   1. a first plurality of gating means, coupled to said first input terminal, for providing a gating signal to said first input terminal in response to a first plurality of signals applied to said first plurality of gating means, and having at least one of said first plurality of gating means also coupled to said first output terminal.

3. The combination as recited in claim 2 including, coupled to said first electrical latching, network inverter means for inverting the third series of non-inverted pulses received by the first latching electrical network when any one of said gating means is enabled.

4. The combination as recited in claim 3 wherein said plurality of gating means are OR'ed together and wherein one gating means has a signal applied to it indicative of the state of the main memory store (MMS), and another gating means has applied to it the third series of non-inverted pulses, and wherein said MMS has maintaining means for maintaining said state of said MMS in the same state that it was when any of said third series of non-inverted pulses are applied to said another gating means, and also has sustenance means for sustaining said state at least for the duration of said any one of the third series of non-inverted pulses.

5. In combination with a general purpose computer a method of generating an override signal for overriding a first request signal issued to said computer comprising the steps of:

a. receiving from said computer the request signal and generating in response to the request signal a first rectangular pulse having a first predetermined width, by causing a first signal to go high, delaying said first high signal, and then causing said first high signal to go low, b. generating in response to said first rectangular pulse signal a second rectangular pulse signal having a second predetermined width by causing a second signal to go high, delaying said second high signal and causing said second high signal to go low, c. delaying the second rectangular signal with respect to the first rectangular signal, d. generating an ovverride signal by inverting the second rectangular square wave signal; and combining said positive and negative pulses whereby a portion of the first rectangular signal is canceled leaving that portion of the first rectangular signal not canceled as the override signal, and e. applying the override signal to a latching network and latching that network in the state that it was immediately upon the application of the override signal and maintaining the latching network in the latched state until immediately after the removal of said override signal.

6. An override assurance network for generating electrical signals in response to a Go electrical request signal for application of said electrical signals to an outside electrical latching network, to maintain said latching network in the same latched or unlatched state as when said electrical signals were applied to said outside electrical latching network, said override assurance network comprising:

a. a first electrical path having a first input terminal for receiving and storing said Go electrical request signals indicative of a request to service the state of said outside electrical latching network, said first electrical path comprising:

1. first gating means, coupled to said first input terminal, for providing a first gating signal in response to a plurality of signals applied to it, 2. first delay means, coupled to said first enabling means, for imparting a first predetermined time delay to the Go signal first received by said first electrical path, 3. first inverting means coupled to said first delay means and to said gating means, for inverting the signal received by said first electrical path, whereby said first electrical path generates a first series of rectangular electric pulses of a first predetermined width in response to the Go signal, b. a second electrical path having a second input terminal coupled to said first electrical path for receiving the first series of rectangular electrical pulses from said first electrical path, said second electrical path comprising:

1. second gating means, coupled to said second input terminal, for providing a second gating signal in response to any one of said first series of rectangular electrical pulses, 2. second inverting means, coupled to said second gating means, for inverting the first series of rectangular electric pulses, 3. second delay means, coupled to said second inverting means and to said second gating means, for delaying by a second predetermined amount the inverted series of pulses in said second electrical path relative to the non-inverted series of pulses in said first electrical path, 4. combining means coupled to said first and second electrical paths for combining said inverted delayed series of pulses with said non-inverted series of pulses, whereby said inverted delayed series of pulses cancel that portion of non-inverted series of pulses not delayed relative to each other leaving a third series of non-inverted pulses having a second predetermined width, and c. a third electrical path coupled to said first and second electrical paths for issuing state signals to said priority resolving network indicative of the current state of said MMS.

7. The combination as recited in claim 6 wherein said third electrical path is comprised of:

a. a first electrical latching network having a first input terminal and a first output terminal, said first electrical latching network further comprising:

1. a first plurality of gating means, coupled to said first input terminal providing a gating signal in response to a plurality of signals applied to it, with at least one of said plurality of gating means being coupled to said first output means.

8. An override assurance network as recited in claim 7, including further delay means, coupled to said first electrical, path.

9. In combination with a Main Store Sequencer (MSS) for processing information between a Main Memory Store (MMS), and a Central Processing Unit (CPU), Buffer Store (BS), Input/Output Control Unit (IOC) and Priority Resolving Means for resolving priority conflicts for MMS access among the CPU, BS and IOC Units, an Override Assurance Network for generating electric rectangular pulse signals for application to an electrical latching network to maintain said electrical latching network, during the application of any one of said rectangular pulse signals, in the same state that said electrical latching network was immediately upon the application of said rectangular pulse, said override assurance network comprising:

a. first electrical rectangular pulse generating, network responsive to a request-for-service (Go) signal issued by said CPU or IOC, for generating a first series of electrical rectangular pulses at a predetermined rate, and having first width adjusting means for providing a predetermined width;

b. a second electrical rectangular pulse generating network, coupled to said first electrical rectangular pulse generating network, for generating in response to said first series of electrical rectangular pulses, a second series of electrical rectangular pulses at substantially the same rate as the first series of pulses and having second adjust means for providing a second predetermined width which is smaller than said first predetermined width, and, c. a third electrical network coupled to said first and second electrical networks for issuing state signals to said first and second electrical networks indicative of the current state of said MMS.

10. The combination as recited in claim 9 including a second delay means in said second electrical rectangular-pulse generating network for delaying said second series of pulses.

11. The combination as recited in claim 9 wherein said electrical latching network includes first and second means for receiving said second series of pulses and a memory-busy/not-busy signal respectively, said memory-busy/not-busy signal indicative of the state of the MMS.

12. The combination as recited in claim 11 including third means for maintaining said memory-busy/not-busy signal in the same state that it was immediately upon the receipt at said first means of any one of said second series of pulses, said same state being maintained for the duration of said any one pulse on said first means, regardless of the state of said memory-busy/not-busy signal during the duration of said pulse.

* * * * *

UNITED STATES PATENT OFFICE

CERTIFICATE OF CORRECTION

Patent No. 3,820,081 Dated June 25, 1974

Inventor(s) Thomas J. Donahue

It is certified that error appears in the above-identified patent and that said Letters Patent are hereby corrected as shown below:

Column 50, line 17, delete "and," 1st occ. and insert -- electrical -- .

Column 51, line 37, delete "ovverride" and substitute therefor --override--.

Column 51, line 38, delete ";" after signal.

Signed and sealed this 19th day of November 1974.

(SEAL)
Attest:

McCOY M. GIBSON JR.
Attesting Officer

C. MARSHALL DANN
Commissioner of Patents

RM PO-1050 (10-69)

USCOMM-DC 60376-P69
* U.S. GOVERNMENT PRINTING OFFICE : 1969 O—366-334.